(12) United States Patent
Ralston

(10) Patent No.: US 8,896,652 B2
(45) Date of Patent: Nov. 25, 2014

(54) SYSTEM AND METHOD FOR REAL-TIME VIDEO COMMUNICATIONS

(75) Inventor: John D. Ralston, Portola Valley, CA (US)

(73) Assignee: Soryn Technologies LLC, Jersey City, NJ (US)

( * ) Notice: Subject to any disclaimer, the term of this patent is extended or adjusted under 35 U.S.C. 154(b) by 12 days.

(21) Appl. No.: 13/407,732

(22) Filed: Feb. 28, 2012

(65) Prior Publication Data

US 2013/0057639 A1    Mar. 7, 2013

Related U.S. Application Data

(60) Provisional application No. 61/447,664, filed on Feb. 28, 2011.

(51) Int. Cl.
| | |
|---|---|
| H04N 7/14 | (2006.01) |
| H04L 12/18 | (2006.01) |
| H04N 21/24 | (2011.01) |
| H04N 21/4728 | (2011.01) |
| H04N 21/647 | (2011.01) |

(52) U.S. Cl.
CPC ........ *H04L 12/1827* (2013.01); *H04N 21/2402* (2013.01); *H04N 21/2404* (2013.01); *H04N 21/2405* (2013.01); *H04N 21/4728* (2013.01); *H04N 21/64707* (2013.01)
USPC ...................................................... 348/14.02

(58) Field of Classification Search
USPC ..................... 348/14.02, 14.01, 14.08, 14.09
See application file for complete search history.

(56) References Cited

U.S. PATENT DOCUMENTS

| | | | | |
|---|---|---|---|---|
| 2007/0182811 | A1* | 8/2007 | Rockefeller et al. | 348/14.02 |
| 2009/0021572 | A1* | 1/2009 | Garudadri et al. | 348/14.01 |
| 2011/0249079 | A1* | 10/2011 | Santamaria et al. | 348/14.02 |
| 2012/0218374 | A1* | 8/2012 | Matula et al. | 348/14.12 |

* cited by examiner

*Primary Examiner* — Stella Woo
(74) *Attorney, Agent, or Firm* — Barnes & Thornburg LLP; Thomas J. McWilliams; Edward F. Behm, Jr.

(57) ABSTRACT

Systems and methods for video communication services are presented herein. In particular, systems and methods in which multiple participants can simultaneously create and share video in real-time are presented herein. Other systems and methods are also presented herein.

4 Claims, 21 Drawing Sheets

Figure 7.

| Measured Network Impairments | units | average | peak |
|---|---|---|---|
| Round trip delay between handset and networked server | (msec) | 150 - 350 | 600 - 1600 |
| Uplink delay between handset and networked server | (msec) | 100 - 200 | 400 - 1000 |
| Downlink delay between handset and networked server | (msec) | 50 - 150 | 200 - 600 |
| Jitter between handset and networked server | (msec) | 25 - 50 | 100 - 150 |
| Packet loss between handset and networked server | (%) | 0.33 - 1.2 | 2 - 5 |
| Effective real-time uplink bandwidth between handset and networked server | (kbps) | 150 - 250 | 500 - 800 |
| Effective real-time downlink bandwidth between handset and networked server | (kbps) | 300 - 600 | 700 - 1200 |

SYSTEM AND METHOD FOR REAL-TIME VIDEO COMMUNICATIONS

CROSS-REFERENCE TO RELATED APPLICATIONS

This application claims the benefit of U.S. Provisional Application No. 61/447,664, filed on Feb. 28, 2011, and entitled "System and Method for Real-Time Video Communications", which is incorporated herein by reference.

FIELD OF INVENTION

The present invention relates generally to video communication services. More particularly, the present invention relates to electronic devices, computer program products, and methods with which multiple participants can simultaneously create and share video in real-time.

BACKGROUND OF THE INVENTION

Demand for Real-Time Video

Explosive growth in consumer and business demand for real-time video on mobile and Internet devices has created exciting new commercial opportunities and major new technical challenges. As they pursue the integration of new real-time video capabilities (FIG. 1) for mobile/Internet communication, business collaboration, entertainment, and social networking, device manufacturers, network infrastructure providers, and service provides are struggling to meet customer expectations for higher quality real-time video across a wider range of devices and networks.

Limitations of Broadcast Video Solutions

Today's standard video processing and distribution technologies have been developed to efficiently support one-way video broadcast, not the two-way and multi-party video sharing required for real-time mobile and Internet user interaction. Traditional broadcast industry solutions have proven to be too computationally complex and bandwidth hungry to deliver the device, infrastructure, or bandwidth requirements for commercially scalable real-time mobile/Internet video services.

Device, Network, and Video Fluctuations

Furthermore, the available computational resources on many devices, as well as the delay, jitter, packet loss, and bandwidth congestion over user networks cannot be guaranteed to remain constant during a real-time video/audio communication session. In the absence of any adaptation strategy, both device and network loading can lead to significant degradation in the user experience. An adaptation strategy designed to address network fluctuations but not device loading fluctuations is ineffective, since it is often difficult to distinguish between these two contributors to apparent "lost packets" and other performance degradations. Adaptation to frame-to-frame fluctuations in inherent video characteristics can provide additional performance benefits.

Embodiments of the present invention comprise an all-software Real-time Video Service Platform (RVSP). The RVSP is an end-to-end system solution that enables high-quality real-time two-way and multi-party video communications within the real-world constraints of mobile networks and public Internet connections. The RVSP includes both Client and Server software applications, both of which leverage low-complexity, low-bandwidth, and network-adaptive video processing and communications methods.

The RVSP Client (FIG. 2) integrates all: video and audio encode, decode, and synchronization functions; real-time device and network adaptation; and network signaling, transport, and control protocols, into a single all-software application compatible with smartphone and PC operating systems. The RVSP client application has been designed to accommodate fluctuations in: the internal loading of client devices; external impairments on a variety of different user networks; and inherent video characteristics such as frame-to-frame compressibility and degree of motion.

The RVSP Server (FIG. 3) integrates multiparty connectivity, transcoding, and automated video editing into a single all-software application. The all-software architecture of the RVSP supports flexible deployment across a wide range of network infrastructure, including existing mobile application/media server infrastructure, standard utility server hardware, or in a cloud computing infrastructure. For both peer-to-peer and server-based real-time 2-way video share services and multi-party video conferencing, the RVSP platform reduces both the up-front capital expenditures (CapEx) and on-going operational expenditures (OpEx) compared to existing video platforms that utilize significantly higher bandwidths and require additional specialized video hardware in both the user devices and the network infrastructure.

In order to meet customer expectations for higher quality video across a wider range of devices and networks, mobile operators and other communication service providers worldwide have made significant new investments in IP Multimedia Subsystem (IMS) network infrastructure. By reducing bandwidth consumption and supporting higher concurrent user loading capabilities for a given infrastructure investment and bandwidth allotment in an IMS deployment (FIG. 4), the RVSP provides significant CapEx and OpEx reductions over competing real-time video platforms that require additional specialized video hardware in both the user devices and the network infrastructure.

The RVSP also delivers similar CapEx and OpEx benefits for "over the top" (OTT) and direct-to-subscriber deployments of real-time video services (FIG. 5) using standard utility server hardware or in a cloud computing infrastructure. In these cases, mobile devices communicating via public Internet or corporate networking infrastructure typically do not have access to video quality-of-service (QoS) enhancements in the mobile operator's IMS core. The real-time network adaptation features of the RVSP disclosed here then become critical to delivering a compelling user experience within the real-world constraints of mobile networks and consumer Internet connections.

Video conferencing systems are evolving to enable a more life-like "Telepresence" user experience, in which the quality of the real-time video and audio communications and the physical layout of the meeting rooms are enhanced so that multiple remote parties can experience the look, sound, and feel of all meeting around at the same table. As shown in FIG. 6, multi-user video conferencing systems typically require specially designed meeting rooms with dedicated video cameras, large size video displays, arrays of audio microphones and speakers, and specialized processing equipment for digitizing, compressing, and distributing the multiple video and audio streams over dedicated high-speed data network connections.

For many consumer and business applications, there is a need to extend higher quality multi-party video communications to participants using a wider variety of less-specialized video-enabled electronic devices, including mobile communications devices, laptop computers, PCs, and standard TVs. There is also a need to extend immersive business communications to support a wider range of consumer and professional collaboration and social networking activities.

When it comes to multi-party video communications, users of these less-specialized electronic devices encounter a number of drawbacks in the devices and in the user experience. For example, these devices may have a wide range of video processing capabilities, video display sizes, available connection bandwidths, and available connection quality-of-service (QoS). Furthermore, without the benefit of specially designed meeting rooms, creating a "perceptually pleasant" meeting experience is challenging. Many video conferencing systems rely on a static screen layout in which all participants are presented within an array of equal-sized video "tiles", even though several participants may be passive listeners throughout much of the meeting and hence contribute very little. These "static" multi-party video default display layouts have many drawbacks, including:

1. All participants are displayed at the same image size, same image quality, and same video frame rate, regardless of their level of participation.
2. Individual participants have no control over the display layout on their own device.
3. A participant with the role of "moderator" cannot "give the floor" to individual participants, as they can in a face-to-face conference setting.
4. Participants cannot choose to focus on one other participant, as they can in a face-to-face conference setting.

When deployed together, the RVSP Client and Server applications enable multiple participants to simultaneously create and share high-quality video with each other in real-time, with many key aspects of a face-to-face user experience.

BRIEF DESCRIPTION OF THE DRAWINGS

To facilitate further description of the embodiments, the following drawings are provided, in which like numbers in different figures indicate the same elements.

FIG. 7 illustrates examples of network impairments.

DETAILED DESCRIPTION

RVSP Client Application

Figure 1:
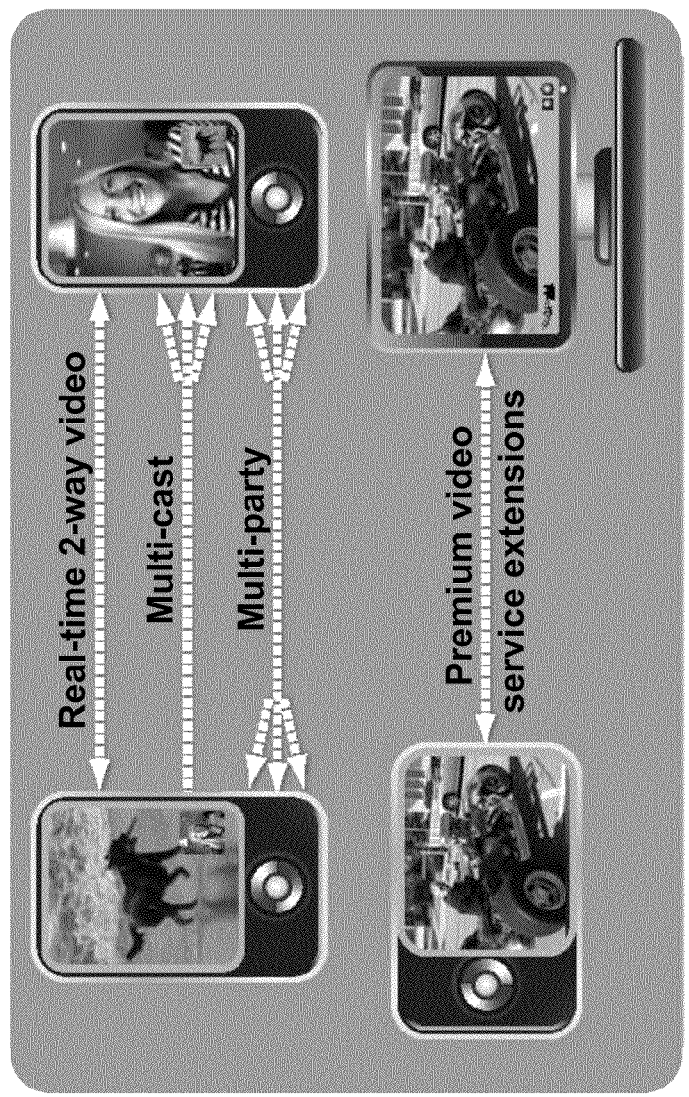
FIG. 1 illustrates examples of real-time video services.
Figure 2:
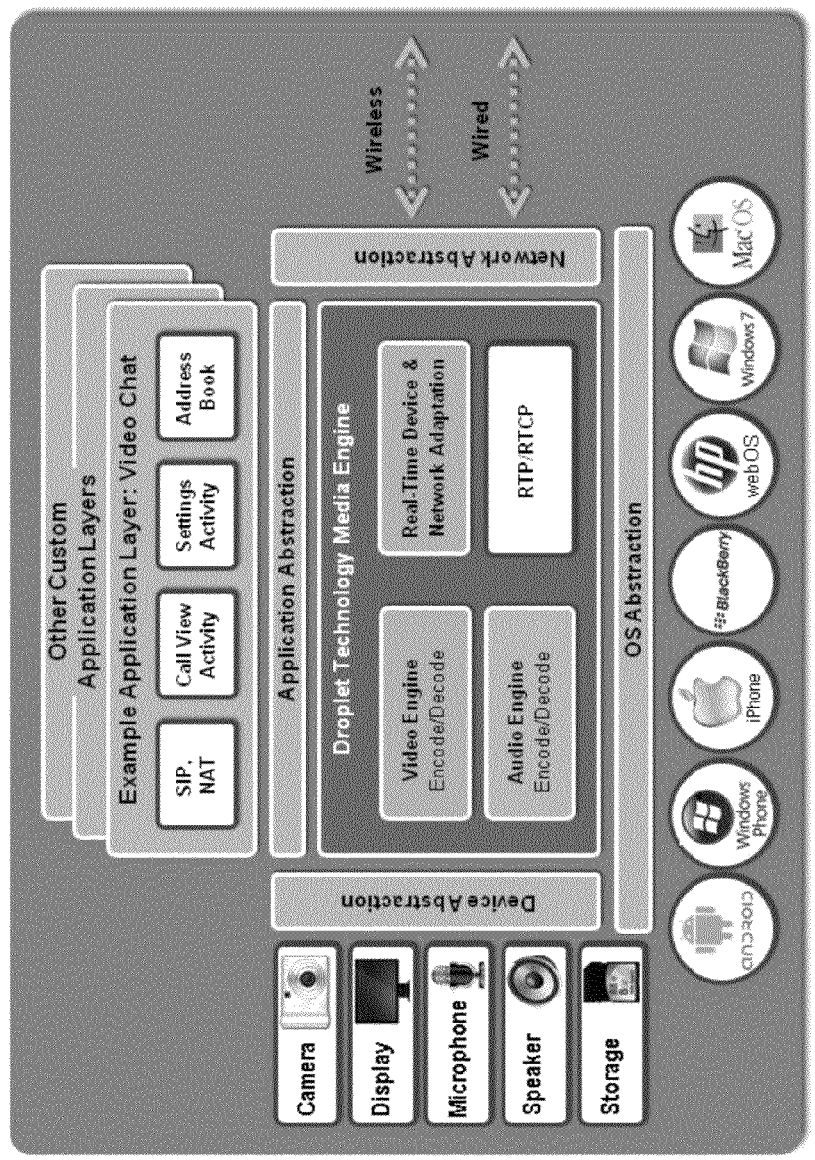
FIG. 2 illustrates an example of real-time video service platform client according to an embodiment of the present invention.

As illustrated in FIG. 2, the RVSP Client integrates all: video and audio encode, decode, and synchronization functions; real-time device and network adaptation; and network signaling, transport, and control protocols, into a single all-software application compatible with leading smartphone and PC operating systems. The highly modular and open API architecture of the RVSP Client supports rapid and flexible device and service customization. Key components of the RVSP Client application include the Digital Technology Media Engine (DTME), Application Layer, and Device Abstraction, OS Abstraction, and Network Abstraction modules. The RVSP Client can include more or less components than specifically mentioned herein.

Application Layer

The Application Layer provides the primary user interface (UI), and can be rapidly customized to support a wide range of real-time video applications and services with customer-specified User Experience Design (UxD) requirements. The Application Layer is implemented in Java to leverage the many additional capabilities included in today's mobile device and PC platforms. An example Application Layer for a mobile Video Chat service would include the following modules:

| | |
|---|---|
| SIP, NAT (Session Control) Module | Ensures compatibility with real-time communications infrastructure deployed by mobile operators and Internet video service providers. Implements SIP-based call session provisioning, device registration, device and service capabilities exchange, call session management, and media routing. The RVSP Client has been successfully integrated with multiple SIP servers and other proprietary signaling protocol servers. |
| Call View Activities Module | Implements the User Interface (UI) for each application, allowing for customer-specific branding at both the device and service level. |
| Settings Module | Governs the user editable settings for each application or service. Settings are preserved in the device database and thus persistent |
| Address Book Module | Interacts with both the native handset address book and any additional Network Address Book and Presence functions. |

DTME

The DTME implements all media (video and audio) processing and delivery functions. The DTME collects media streams from their designated sources, encodes or decodes them, and delivers the encoded/decoded media streams to their designated destinations. Each media source may be a hardware device (camera, microphone), a network socket, or a file. Similarly, each media destination may be a hardware device (display, speaker), a network socket, or a file.

| | |
|---|---|
| RTP/RTCP Stack | Enables efficient network operations, and interfaces directly with device input/output devices (camera, and display, microphone and speaker) via a hardware abstraction layer. The RTP/RTCP stack also includes an Adjustable Jitter Buffer, which automatically sets the jitter buffer depth depending on network conditions determined by the RTA module. |
| Real-Time Adaptation (RTA) Module | In order to provide an industry-leading real-time mobile video user experience, the RVSP Client application includes a Real-Time Adaptation (RTA) Module designed to accommodate fluctuations in the internal loading of a variety of different client devices, external impairments on a variety of different user networks, and inherent video characteristics such as frame-to-frame compressibility and degree of motion. In the absence of real-time adaptation, device and network loading significantly degrade user experience in real-time mobile/Internet video services. |
| DTV-X Video Codec | The DTV-X Video Codec at the heart of the DTME dramatically reduces the computational complexity of high-quality, real-time video capture and playback, enabling all-software implementations on mobile handsets. The DTV-X codec dramatically reduces compressed image data size while retaining high picture quality, extends device and networked video storage capacity, realizes higher image-per-second live monitoring/playback, enables faster download speeds, and supports advanced video manipulation in the device and/or in the network. |
| Other Video Codecs | Since the video codec functions are fully abstracted in the DTME, the RVSP Client can be configured to utilize any other video codecs, such as H.263 and H.264, which are already integrated into handset or PC hardware. This feature enables support for the widest possible range of devices and legacy video service infrastructure. |
| Audio Codecs | In a similar manner, the audio codec functions are also fully abstracted in the DTME, so that the RVSP can be configured to utilize a wide range of embedded audio codecs and acoustic echo cancelation solutions. |

The DTME communicates with the Application layer thru a well-defined Application Layer Interface (DTME API) for rapid and flexible customization across a wide range of real-time video applications. The DTME API also enables a "headless" client, allowing third parties such as handset OEMs and video service providers to develop their own custom applications.

Device Abstraction, OS Abstraction, and Network Abstraction Modules

These modules allow installation and interoperability of the RVSP Client on devices running all of today's leading smartphone and PC operating systems. They also allow the RVSP Client to accommodate the wide range of cameras, displays, and audio hardware found in smartphones and PCs, and allow real-time video services to leverage the widest possible range of 3G, 4G, WiFi, DSL, and broadband network connectivity modes.

RVSP Server Application

Figure 3:
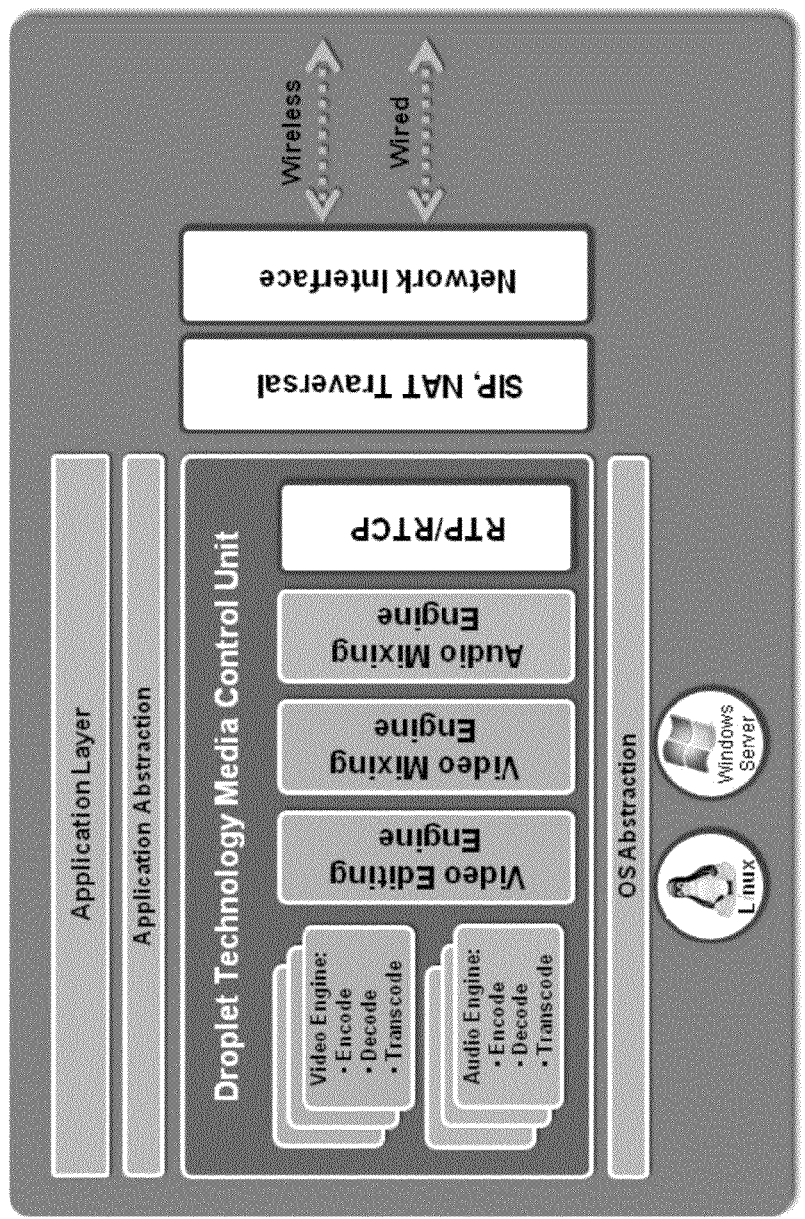
FIG. 3 illustrates an example of a real-time video service platform server application according to an embodiment of the present invention.
Figure 4:
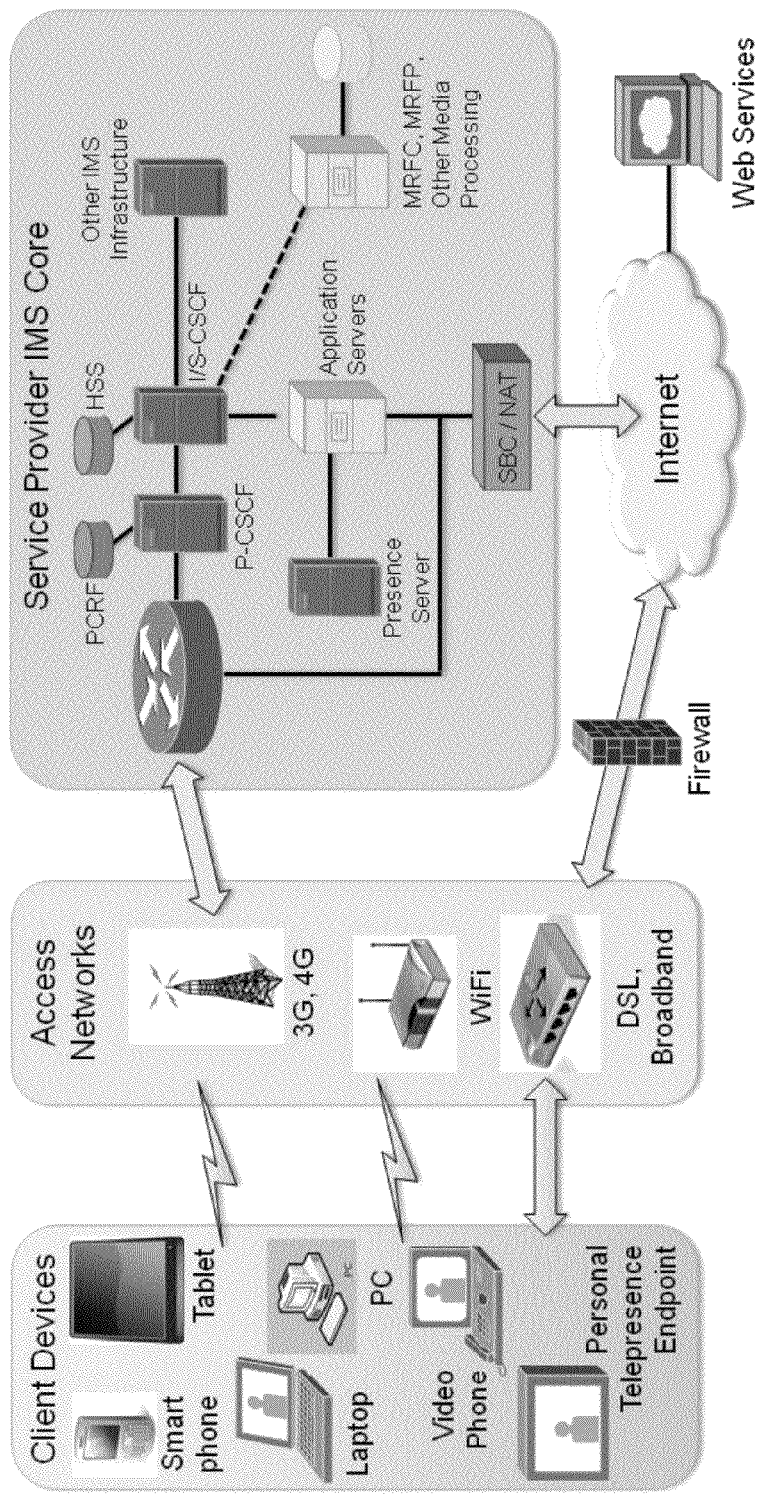
FIG. 4 illustrates an example of a system according to an embodiment of the present invention.
Figure 5:
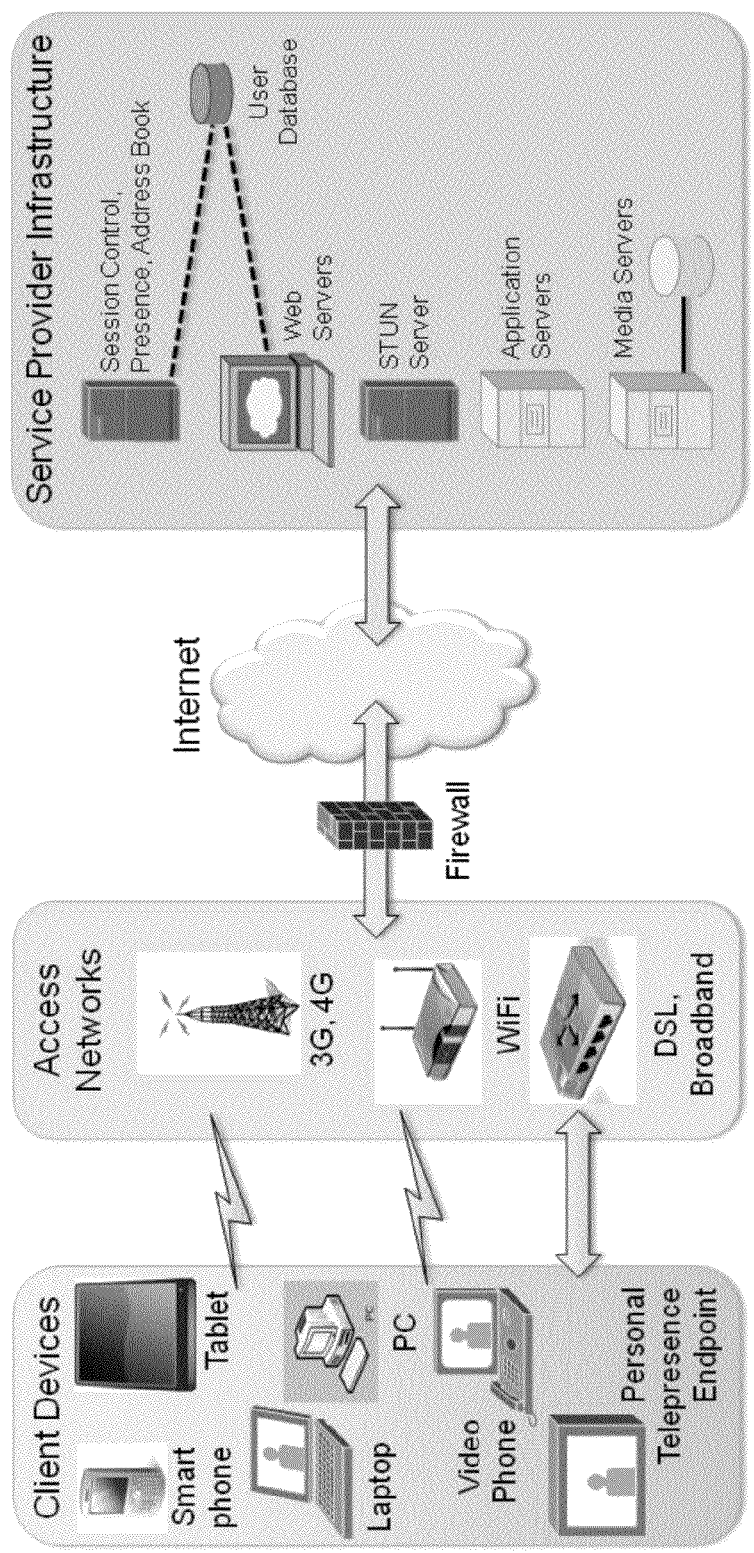
FIG. 5 illustrates an example of a system according to an embodiment of the present invention.
Figure 6:
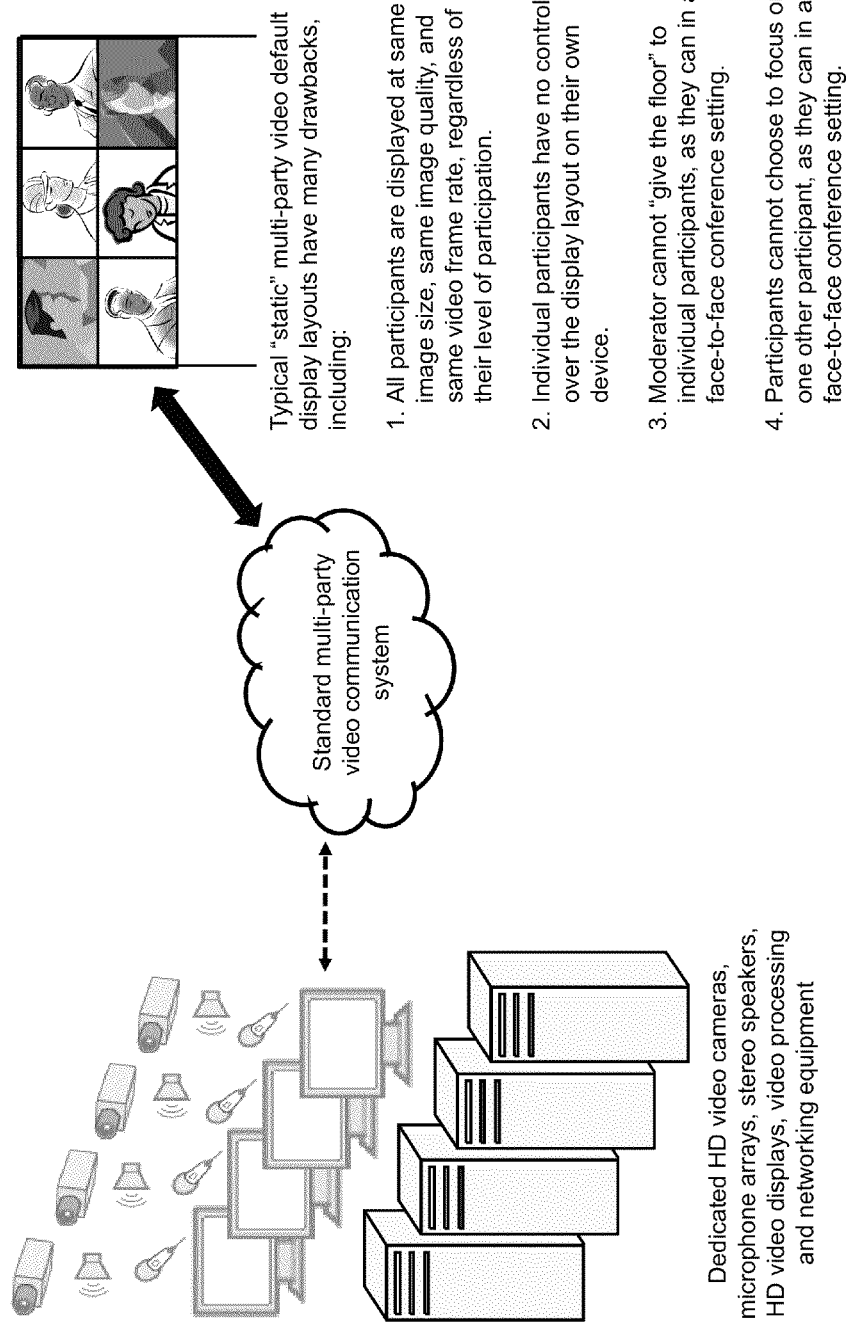
FIG. 6 illustrates an example of a multi-party communication system.

As shown in FIG. 3, the RVSP Server integrates multiparty connectivity, transcoding, and automated video editing into a single all-software application that can be deployed both on existing mobile operator server infrastructure or standard utility servers in a cloud computing infrastructure.

Many real-time video services require support for additional network based video processing, including multiparty connectivity
transcoding
automated video editing
multimedia mashups
connectivity to legacy video conferencing systems.

The RVSP Server provides these functions in an industrial-strength solution built using standards-based software—without the use or added expense of a hardware-based MCU or MRF appliance. An all-software RVSP Server solution enables customers to purchase only the number of ports they need, then grow into additional ports as the user base expands. The RVSP Server solution's flexible capacity management also enables video service providers to roll-out services spanning mobile video chat thru broadband HD videoconferencing on a single platform.

| RVSP Server Specifications | System Requirements |
|---|---|
| SIP compatible, multipoint video and voice conferencing, transcoding, and automated media mixing and editing | Operating System: Linux, Windows Server 2003 R2/2008 |
| On-demand, personal meeting rooms or one-click, ad-hoc conferences | Processor: Dual Core processor or higher required for operation |
| Personal layout selection with continuous presence, automatic layout adaptation based on number of conference participants | 2.5 GHz Xeon processor or higher required for HD video support |
| | Concurrent user capacity varies based on available processor speed and number of available cores |
| Large conference support up to the capacity of the MCU | Resource usage varies by selected resolution |
| Up to 720 p 30 transmit and receive resolutions, call rates up to 4Mbps | Memory: 4 GB |
| Selectable 4:3 and 16:9 aspect ratio for transmitted video | Diskspace: 2 GB |
| DTV-4, H.264, H.263+, and H.263++ video codecs AMR, AAC-LC, G.711, G.722, G.722.1c, MP3 audio codecs | Network: Single, 100 Mbps network adapter with full duplex connectivity and a static IP address |
| SIP Registration and proxy support | Virtual Servers: Supported; dedicated resources required |
| Web-based, remote configuration and management | |
| Multi-level administrative access control using Windows domain and local host authentication authorities | |
| Usage and system logging to Microsoft SQL Server 2008 | |
| Configurable DiffServ settings for audio and video | |
| Endpoint API via SIP CSTA for advanced conference management | |
| REST API for management integration | |

Additional RVSP Server benefits include:

Natural Interactions—High quality media experience across a wide range of devices and networks Standards Based—Supports existing conferencing standards and interfaces to legacy conferencing systems Right-sized Buying—Flexible deployment model empowers customers to license only the ports they need Scalability—Easily add host server processing power to increase RVSP Server capacity Flexible Capacity Management—Ensures optimal resource usage Transcoding/Transrating—For each port, ensures that endpoints receive the best possible experience based on their capabilities.

Real-Time Adaptation Sub-System

A Real-Time Adaptation (RTA) sub-system has been integrated into the RVSP client application to enable prediction and/or measurement of, and adaptation to, fluctuations in the following device/network impairments and video characteristics:

Device Impairments

Existing real-time video client applications running on commercially available smart phones, tablets, and other video-enabled devices suffer from many device impairments, including:

Differences between front camera versus rear camera. Some devices have front cameras limited to 15 fps and VGA (640×480 pixels) image sizes, while rear cameras on the same devices can support up to 30 fps and larger image sizes.

Limited control of camera frame rate. Some camera modules, once activated in video mode, deliver a constant frame rate (i.e. 30 fps) regardless of what frame rate is requested by the calling application Poor tracking of camera frame rate. Some camera modules, once activated in video mode, do not accurately track and maintain the requested frame rate. Deviations between requested and delivered video frame rates may also be influenced by processor loading due to other applications running on the device.

CPU loading during camera operation. Some camera modules, once activated in video mode, automatically activate additional video processing functions in the device that can lead to significant processor loading. This loading in turn can limit overall real-time video applications to lower frame rates than targeted.

Resulting real-time video application degradations resulting from failure to adapt to device impairments include:

discrepancies between uncompressed video frame rates requested by the real-time video client application and the actual frame rates delivered by device camera modules uncompressed video frames that are delivered to the real-time video client by the device camera module, but cannot be passed to the video encoder due to timing limitations compressed video frames that arrive in the real-time video client, but cannot be passed to the video decoder due to timing limitations Network Impairments Existing real-time video services running on commercial wireless (3G, 4G, WiFi) and wireline (DSL, broadband) suffer from many network impairments (FIG. 7), including:

Packet delay & jitter in the network.

Outright packet loss in the network.

Other "network congestion". Traffic contention due to the presence of other data traffic can manifest itself as a decrease in available network bit rate and/or decrease in data stream signal-to-noise ratio (SNR). Traffic contention may also manifest itself as increased packet delay/jitter and packet loss in the network.

Asymmetry between uplink & downlink characteristics for each party on a real-time video call session.

Resulting real-time video application degradations resulting from failure to adapt to network impairments include:

media packets/audio & video frames that arrive in the receiver's client device but are sufficiently delayed/out of order that the client application is forced to ignore them and not pass them to the decoder media packets/audio & video frames, and control/signaling information that never arrive in the receiver's client device wide variations in the quality of individual participants' video streams on a multi-party video conference.

Variations in Inherent Video Characteristics

Figure 8:
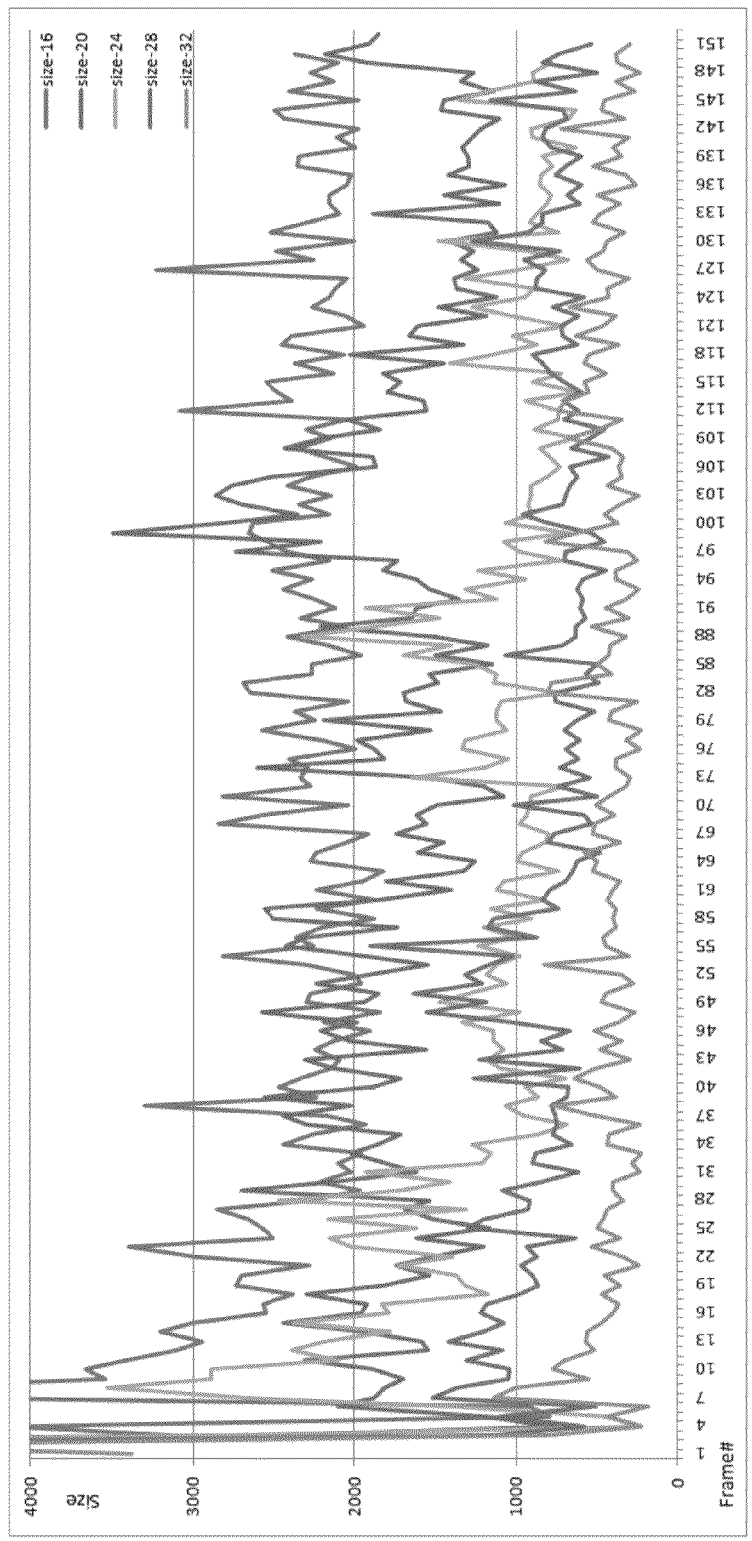
FIG. 8 illustrates an example of measured variations in compressed video frame size generated for a constant level of perceived image quality.

Testing on commercially available smart phones, tablets, and other video-enabled devices has revealed that, depending on typical frame-to-frame variations in inherent video data characteristics such as the relative degree of luma and chroma detail and frame-to-frame motion, the bits/frame required to maintain a constant level of user-perceived image quality can vary significantly (FIG. 8).

Real-time video application degradations that can result from failure to adapt to variations in such characteristics as frame-to-frame compressibility and degree of motion include:

the real-time video client attempting to drive target bits/frame or frames/second to unnecessarily high or unattainably low levels during a video call session.

Figure 9:
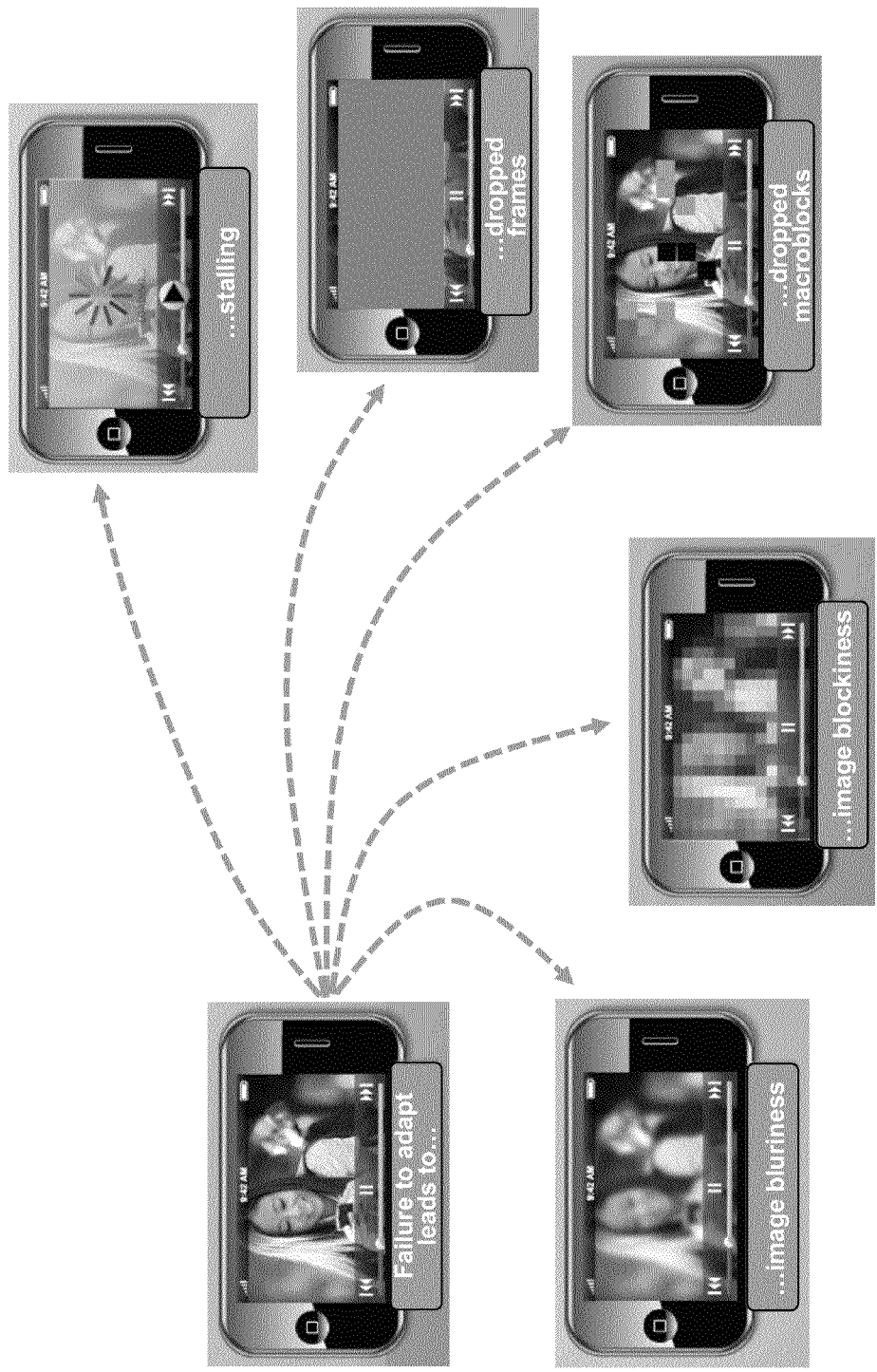
FIG. 9 illustrates examples of video quality and user experience degradations.

The many real-time video quality and user experience degradations that result from failure to adapt to device and network impairments, and fluctuations in inherent video characteristics, include: stalling, dropped frames, dropped macroblocks, image blockiness, and image blurriness (FIG. 9).

RTA Sub-System Design Strategy

Figure 10:
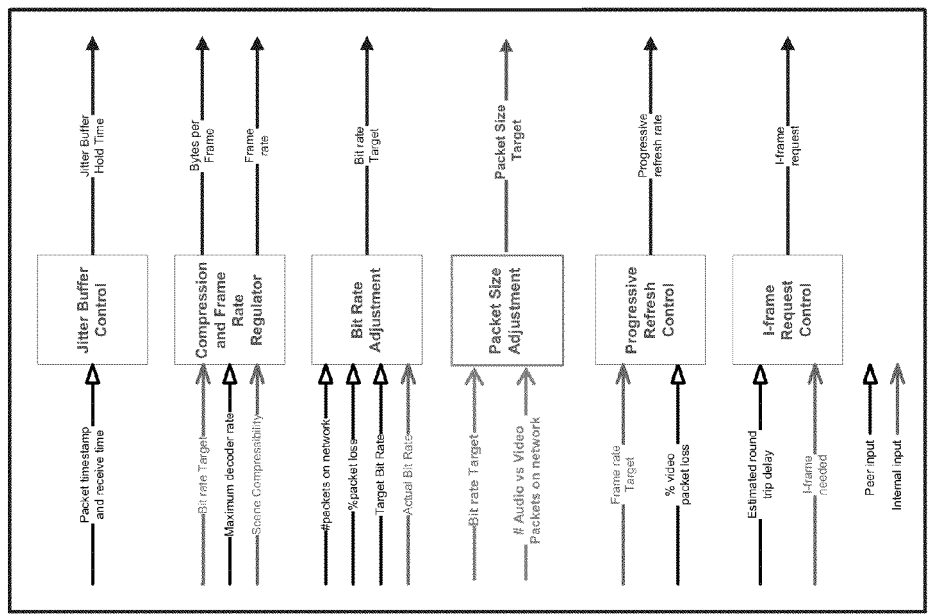
FIG. 10 illustrates an example of a system according to an embodiment of the present invention.

Successful real-time adaptation to the above impairments and fluctuations requires that the RTA sub-system in the RVSP Client application simultaneously analyze fluctuations of multiple video, device and network parameters, via measurement and/or prediction, in order to continuously update and implement an overall real-time video adaptation strategy. FIG. 10 illustrates the RTA Subsystem inputs and control outputs.

Device Impairments: The RTA sub-system analyzes the behavior of uncompressed and compressed audio and video frames being generated, transmitted, stored, and processed within the device to detect and adapt to fluctuations in device loading. The RTA sub-system adapts to the measured fluctuations in device loading via corresponding (i) internal modifications to the target compressed frame rate to be generated and sent from the device to another RVSP-enabled user.

(ii) requested modifications to the target compressed frame rate to be generated and sent to the device from another RVSP-enabled user.

Network Impairments: The RTA sub-system analyzes the audio and video RTP media packets and corresponding RTCP control packets being generated within, and transmitted between, RVSP-enabled client devices, in order to measure/predict and adapt to fluctuations in the network. The RTA sub-system adapts to the measured fluctuations in network performance via corresponding modifications to (i) Targeted uncompressed video frame rate (fps) to be delivered by the camera to the DTV-X video encoder.

(ii) Targeted compressed video bits/frame to be delivered by the DTV-X video encoder. Several encoding parameters determine the compressed video bits/frame, including:

Quantization parameter Q
progressive refresh parameters
saliency parameters
PN frame ratios
I frame insertion
(iii) Targeted video data packet size to be generated by the RVSP client application's RTP/RTCP module for network transmission to another user.
(iv) Video frame/stream format requested from other user: Send/resend I frame
(v) Frame buffers in RVSP media framework
(vi) Packet buffers in RVSP RTP stack
(vii) RTCP messages in RVSP RTP stack Inherent Video Characteristics: The DTV-X video encoder analyzes frame-to-frame variations in the inherent compressibility of uncompressed video frame sequences being delivered from the camera module, and communicates this information to the RTA sub-system. The RTA sub-system utilizes this information to prevent the RVSP client from attempting to drive target bits/frame or frames/second to unnecessarily high or unattainably low levels during a call session. The inherent compressibility will vary with the relative degree of luma and chroma detail and/or the relative degree of motion in a sequence of video frames.

Successful real-time adaptation within the RVSP Client application requires that the above analysis and feedback be implemented as a set of collaborating processes within and between the RTA sub-system, the DTV-X video codec, the RTP/RTCP module, and the Session Control module. During a real-time video session, the RTA sub-system first determines device and network limitations during call setup and capabilities exchange between the participating devices. Once a real-time video has been established, the RTA sub-system continues to analyze and adapt to fluctuations in device and network impairments and video parameters.

Determining Device/Network Limitations during Call Setup: During call setup and capabilities exchange, the RVSP client application determines the media bandwidth appropriate to the targeted user experience that can be supported by the device(s) and network(s) participating in the video call session. For each video call session, this bits/second target is then utilized by the RVSP client application(s) to establish
  the initial video frame resolution and frame rate targets (for camera interfacing)
  the initial bits/frame target (for DTV-X codec interfacing)
  the initial bytes/packet target (for RTP/RTCP module interfacing).

The initial bits/second, frames/second, bits/frame, and bytes/packet targets should likely not be chosen to correspond to the maximum rates that are expected to be supported by the device(s) and network(s) participating in the video call session. Instead, the initial targets should be chosen so as to guarantee a high probability that they will actually be met, in order to avoid prolonged periods at call startup where the RTA sub-system is "out of target" and delivering a degraded user experience.

Figure 11:
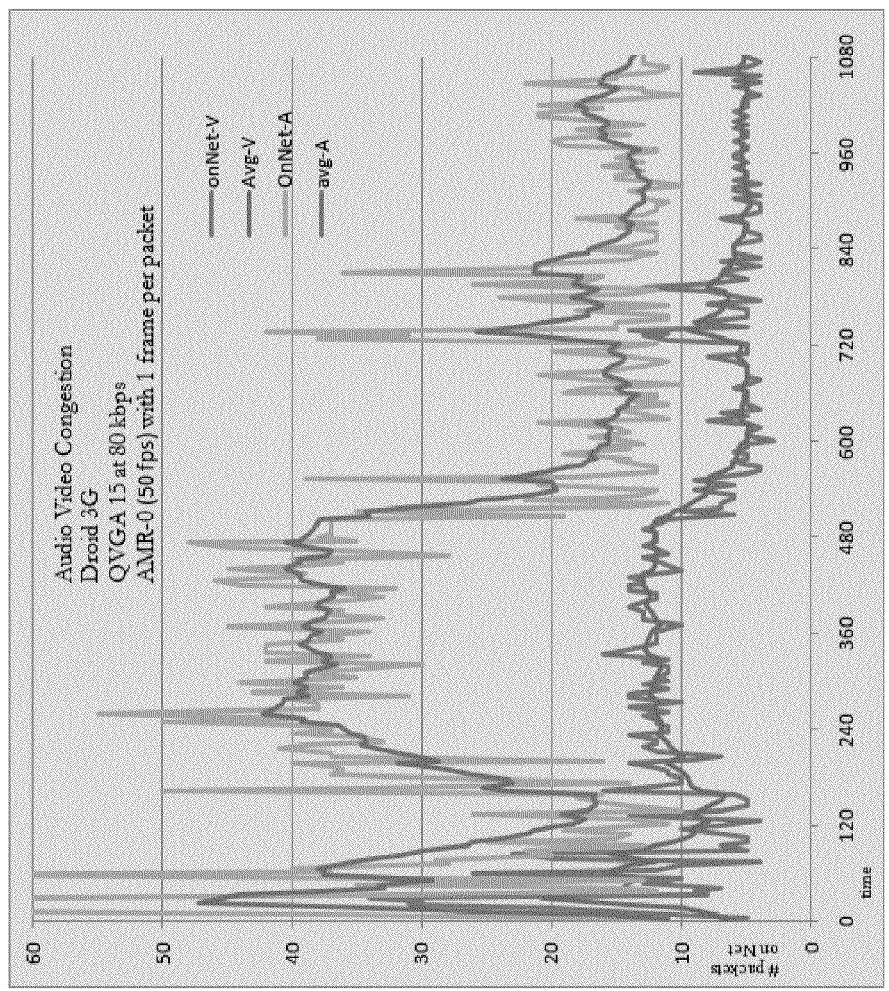
FIG. 11 illustrates an example of differences in network congestion.

Analyzing Device/Network Impairments and Video Parameters During Call:

The following RTA-related parameters are measured during each video call:
  Device Impairments
  i. Camera Speed Degradation
  Measured input is the difference between the uncompressed video frame rate requested from the camera and the actual uncompressed video frame rate that is delivered to the RVSP application for processing by the DTV-X video encoder.
  Used to determine the maximum video frame rate that can be requested.
  ii. Device Loading on Send Channel
  Measured input is the fraction of the uncompressed video frames delivered by the camera that arrive within a time window suitable to be further processed by the DTV-X encoder.
  Used to determine the maximum video frame rate that can actually be encoded and sent.
  iii. Device Loading on Receive Channel
  Measured input is the fraction of the compressed video packets successfully received and re-assembled into complete video frames by the RVSP application within a time window suitable to be further processed by the DTV-X decoder.
  Used to determine the maximum video frame rate that can actually be decoded and displayed.
  Network Impairments
  iv. Network Congestion
  Measured inputs are the RTCP reports and internal video and audio packet output status utilized by each device to determine the number of packets that the device itself has already sent but are still in transit to the target receiving device.
  Used to estimate available network bandwidth in order to update target bit rate in bits/sec and packet size in bytes/packet. Our own measurements have revealed that correlation between the transmission of audio and video packets on mobile network is poor (FIG. 11). Packet tracing added to the DTME to report the number of Audio and Video packets in transit at any given time under multiple controlled and uncontrolled network conditions has shown that the fractional in-transit Audio and Video packet counts are not well correlated, and that both show a significant dependence on packet size for any given level of network congestion. At higher levels of network congestion, smaller video packet sizes result in improved overall video throughput. At lower levels of network congestion, efficient video throughput can be maintained with larger packet sizes.

Good correlation between Audio and Video packets in transit can be used as an indication that network congestion is low and that the Video packet size is small enough to ensure efficient video throughput at the current level of network congestion.

Poor correlation between Audio and Video packets in transit can be used as an indication that network congestion is high and that the Video packet size is not small enough to ensure efficient video throughput at the current level of network congestion.
  v. Uplink and Downlink Network Packet Loss
  Measured inputs are the RTCP reports indicating the fraction of packets lost.
  Used as an additional input to gauge the network congestion and the corresponding effective real-time network bandwidth. Also used to modify "aggressiveness" of progressive refresh and PN frame ratio.
  vi. Uplink and Downlink Network Jitter
  Measured input is the difference between arrival-time intervals (between successive packets, observed as they arrive on the receiver device) and capture-time intervals (between successive packets, as indicated by timestamps written by the sender device). These difference measurements are processed using a rolling average filter to calculate a "recently observed jitter".
  Used to adapt the depth of the RVSP jitter buffer in order to support packet re-ordering.

vii. Roundtrip, Uplink, and Downlink Network Delays

Measured via NTP-based time values provided in RTCP sender report—RFC 1889 section 6.3.1 (also see FIG. 2: Example for round-trip time computation). Let SSRC_r denote the receiver issuing this report. Source SSRC_n can compute the round-trip propagation delay to SSRC_r by recording the time A when this reception report block is received. It calculates the total round-trip time A-LSR using the last SR timestamp (LSR in the RTCP Sender report) field, and then subtracting the delay since the last SR was sent (DLSR in the RTCP Sender report field). The round-trip propagation delay is then given as (A-LSR-DLSR).

May be used to estimate signaling delay that must be accounted for if/when an I-Frame resend request is made from one device to another.

Inherent Video Characteristics viii. Video Frame Compressibility

Measured via the internal compression parameters (quantization levels, prediction mode decisions, and others) and the resulting actual compressed frame size generated by the DTV-X encoder. The inherent compressibility will vary with the relative degree of luma detail, chroma detail, brightness, contrast, and/or the relative degree of motion in a sequence of video frame.

Used to alter the trade-off between bits/frame and frames/second targets during extended sequences of "highly compressible" frames. When frames are highly compressible, it may be advantageous to allocate fewer bits to each compressed image and choose a higher frame rate for smoother motion, within the given overall bit rate target. Conversely, when frames are difficult to compress well, it may be advantageous to reduce the frame rate and allocate more bits to each compressed frame.

ix. Relative Degree of Luma and Chroma Detail

Measured from the quantization levels and resulting compressed size in different wavelet transform subbands for current video frame input to DTV-X encoder.

Used to determine minimum bits/frame required to provide good image fidelity.

x. Relative Degree of Motion in Video Frame Sequence

Measured from motion channel in saliency map for current video frame input to DTV-X encoder.

Used to determine the minimum frame rate required to provide good motion fidelity, and to support lower frame rates and higher bits/frame targets during extended sequences of "low motion" frames. The motion channel of the saliency map generation compares a filtered version of the current frame's luma against the same version of the previous frame or frames, estimating motion based on the magnitude of differences in the comparison.

Adaptation to Device/Network/Video Fluctuations during Call: The RVSP RTA sub-system processes the above inputs from the camera module, DTV-X codec, RTP/RTCP module, and RVSP packet/frame buffers in order to update its estimates of parameters (i)-(x) above.

Adapting the Bit Rate Target: Based on the updated estimates of (i)-(v), the RTA sub-system then either maintains or updates the bit rate target for the next video frame to be encoded. The RTA sub-system must resolve an updated bit rate target into the appropriate combination of fps and bits/frame that will maintain the best possible user experience in the presence of fluctuating device and network characteristics. In more advanced scenarios that exploit DTV-X codec feedback on video frame compressibility (viii) and degree of motion (ix), the RTA sub-system may choose to maintain the bit rate target but modify the underlying combination of fps and bits/frame.

Adapting the Jitter Buffer Depth: Based on the updated estimate of (vi), the RTA sub-system then either maintains or updates the RVSP packet/frame jitter buffer depth(s). If excessive jitter bursts are detected, and these cannot be accommodated by packet re-ordering in the jitter buffer set to its maximum depth, then the corresponding packets must be treated by the RVSP client as if they were lost. The RTA sub-system may send a request to the other user to send a new I-frame in order to reset the decode process at the receiver impacted by the burst. The roundtrip network delay estimate (vii) provides the device with a lower limit on how long it must expect to wait for the requested I-frame to be delivered, and thus how long it must rely on alternative mechanisms (saliency/progressive refresh/V-frames) to deal with the high packet loss.

Adapting to Video Frame Compressibility and Degree of Motion: Based on the updated estimates of (viii)-(x) above, the RTA sub-system then either maintains or updates the bits/frame and frames/sec targets. In order to deliver the best user experience using the least device and network resources, the RTA sub-system can maintain lower bits/frame targets during extended sequences of "highly compressible" frames (low relative degree of Luma and Chroma detail), and/or lower frames/sec targets during extended sequences of "low motion" frames.

RTA Sub-System Implementation

Key Modules

Figure 12:
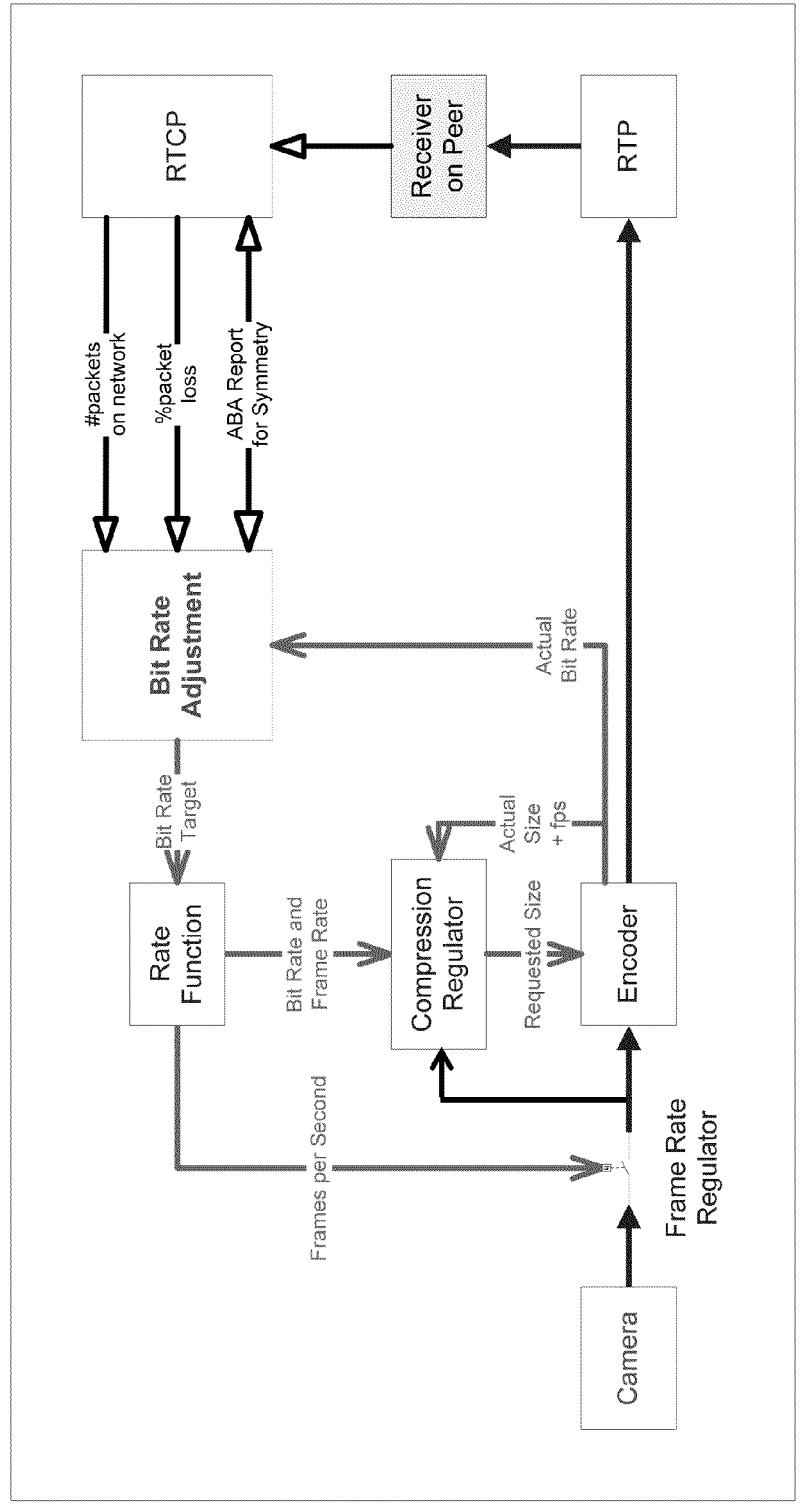
FIG. 12 illustrates an example of a system according to an embodiment of the present invention.
Figure 13:
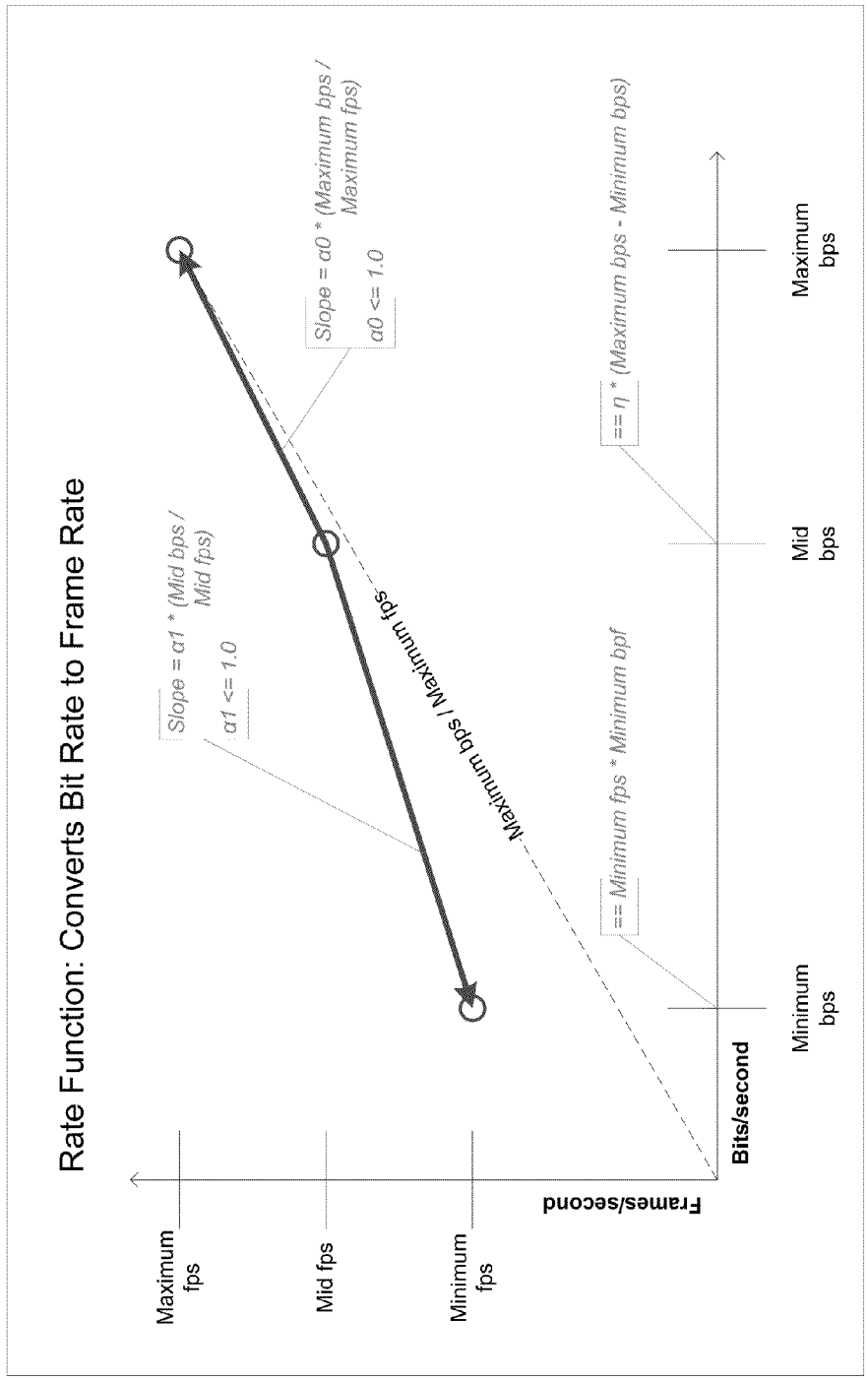
FIG. 13 illustrates an example of a rate function.

As shown in FIGS. 10 and 12, the RTA subsystem includes the following modules:

Automatic Bit Rate Adjustment (ABA)

Rate Function

Frame Rate Regulator

Compression Regulator

Jitter Buffer Control

Packet Size Control

Codec Control

Automatic Bit Rate Adjustment (ABA): The ABA evaluates two measurements of the network performance to determine the target bit rate for video transmission:

(i) Packet Loss Analysis—The receiver maintains a count of the received packets and a count of the gaps in the packet sequence numbering—which are lost packets. Periodically, the receiver sends a report to the sender with the ratio of lost packets.

(ii) Network Buffer Fill Level Analysis—The receiver periodically sends a port to the sender with the sequence number of the last received packet. The sender compares this number to the last sent packet sequence number to approximate the number of packets remaining on the network en route to the receiver.

The ABA compares this bit rate target against the peer's computation to ensure this unit does not consume a disproportionate amount of the available network bandwidth. The ABA unit periodically notifies it's peer with its determined target bit rate for video transmission. The peer compares its own target to this value and when its value is significantly larger, the peer lowers its own target correspondingly.

Rate Function: The Rate Function converts the target bit rate into a corresponding combination of frame rate and bytes/frame for the encoder output. As shown in Frame 13, the rate function incorporates the following parameters:

Minimum bit rate (bits/sec)

Maximum bit rate (bits/sec)

Minimum frame rate (fps)

Maximum frame rate (fps)

Minimum compression level (bytes/frame)

Maximum compression level (bytes/frame)

Frame Rate Regulator: Because the output frame rate from the camera modules on many smartphones and tablets is often irregular, the Frame Rate Regulator provides intermediate frame buffering/processing in order to ensure that the DTV-X video encoder receives video frames at the fps rate targeted by the Rate Function.

Compression Regulator: The Compression Regulator monitors the encoder output and modulates the frames/sec and bytes/frame targets based on the recent frame compressibility history provided by the video encoder. The goal is to deliver the best user experience using the least device and network resources. For example, the RTA sub-system can maintain lower bits/frame and higher frames/second targets during extended sequences of "highly compressible" frames (low relative degree of Luma and Chroma detail), and/or lower frames/sec and higher bits/frame targets during extended sequences of "low motion" frames. Additionally, the Compression Regulator monitors and compares the actual uncompressed video frame rate delivered by the Camera and the actual compressed video frame rate delivered by the Encoder, and adjusts the bytes/frame target to achieve the target bit rate. The Compression Regulator can thus modify the Rate Function described above.

Jitter Buffer Control: The Jitter Buffer Control measures the difference between arrival-time intervals (between successive packets, observed as they arrive on the receiver device) and capture-time intervals (between successive packets, as indicated by timestamps written by the sender device). These difference measurements are processed using a rolling average filter to calculate a "recently observed jitter". If the recently observed jitter increases, the temporal depth of the RVSP jitter buffer in the RTP/RTCP module is increased in order to support packet re-ordering over a larger number of packets. If the recently observed jitter decreases, the temporal depth of the RVSP jitter buffer in the RTP/RTCP module is decreased correspondingly.

Packet Size Control: The maximum transmission unit (MTU) is the largest packet size that can be transmitted over a network. Occasionally, the size of the video frame exceeds this maximum and the frame is split across several packets. The number of packets is first determined and then the frame is split evenly across that number of packets. Packet size can also be reduced/increased to enable more efficient video transmission as network impairments increase/decrease.

Figure 14:
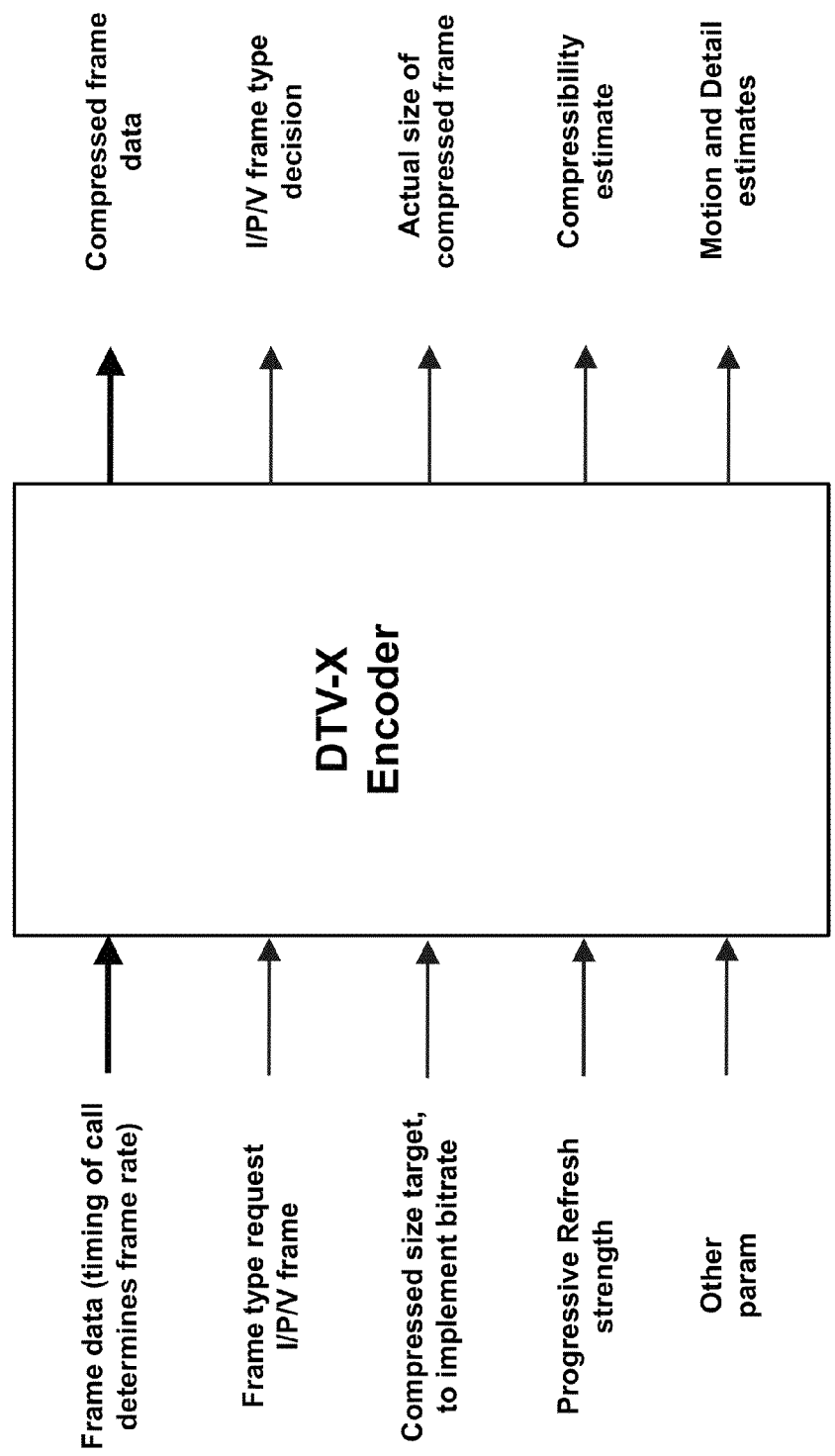
FIG. 14 illustrates an example of a video encoder according to an embodiment of the present invention.

Codec Control: The DTV-X video codec encoder accepts video frames (images) in sequence and produces compressed representations of them for transmission to the DTV-X video codec decoder. It has various control inputs and information outputs, in addition to the input and output of video frames, as can be seen in FIG. 14.

With each frame to be compressed, the encoder accepts a frame type request that can be "I-Frame", "P-Frame", or (in some embodiments) "V-Frame". These designate options in the encoding process and the format of the resulting compressed frame. The encoder will produce an I-frame when requested. It may produce an I frame when a P-frame was requested, if the compression process produces a better result as an I-frame; for example, in the case of a sudden scene change or cut. V-frames are reduced representations that should be used only in between I-frames or P-frames; in some embodiments, the encoder may produce a V-frame when a P-frame was requested.

With each frame to be compressed, the encoder accepts a target for the compressed size of the frame. This target may not be met exactly; if the video is changing in compressibility character, the actual compressed size may differ from the target by a significant factor.

The encoder accepts an input indication of the desired strength of Progressive Refresh, which is the fraction of each P-frame that should be compressed without reference to prior frames or encoding state. The reason for this is that if a frame is lost or cannot be decoded for any reason, the decoder will not have available the necessary state reference for correctly decoding frames that follow the missing frame. Progressive refresh allows the reference state to be refreshed partially in every P-frame, so that it is not necessary to send I-frames periodically. This makes the frame size and transmission bit rate more uniform, and adds robustness against lost packets.

With each compressed frame that it produces as output, the encoder delivers an indication of the frame type actually used for this frame, whether I-Frame, P-Frame, or V-Frame.

With each compressed frame that it produces as output, the encoder delivers an indication of the actual size to which the frame was compressed. This may be compared with the size target that was given as input, and used in a rate control tracking loop to keep actual rate within tighter long-term bounds than the codec's single frame size targeting ability.

With each compressed frame that it produces as output, the encoder delivers an estimate of the compressibility of the frame. This can be used in deciding how to balance frames-per-second against bits-per-frame in the rate control process.

With each compressed frame that it produces as output, the encoder delivers an estimate of the motion activity of the frame, and of the detail levels in the frame. These can be used in deciding how to balance frames-per-second against bits-per-frame in the rate control process.

RTA Bit Rate Adjustment Algorithm Description

The presentation quality of real-time video is impacted by packet delay/jitter and packet loss during transmission over the network. Transmitted bit rates and packet sizes must be adjusted in order to preserve the best possible presentation quality.

DEFINITIONS

Packet Loss rate is the fraction of the total transmitted packets that do not arrive at the intended receiver.

Network Buffer Fill Level is the number bytes (or in the case of uniform packet sizes—the number of packets) currently in transmission through the network.

Packet Loss Analysis: The packet loss ratio is taken directly from the 'fraction lost' field in the RTCP Sender or Receiver Report packet (SR: Sender report RTCP packet—Paragraph 6.3.1 if RFC 1889; RR: Receiver report RTCP packet—Paragraph 6.3.2 if RFC 1889). This value is average filtered:

$$LR_{new} = \alpha_L * LR_{old} + (1-\alpha_L) * LR_{net} \qquad (1)$$

where:

$LR_{new}$ is the newly filtered Packet Loss ratio value;
$LR_{old}$ is the previous Packet Loss ratio value;
$LR_{net}$ is the Packet Loss ratio value from the RTCP receiver report;
$\alpha_L$ is a parameter specifying how aggressive the algorithm reacts to the latest reported value, and $0 \le \alpha_L \le 1$.

Network Buffer Fill Level Analysis: The sender keeps track of the latest transmitted packet sequence number. The receiver reports the latest received packet sequence number in its RR report. The sender subtracts its number from the receiver's number to calculate the amount of data currently in transmission through the network. Since the report's value is inherently offset by the network delay between receiver and sender, the difference defines an upper estimate of the network buffer fill level. This value is average filtered:

$$N_{new} = \alpha_N * N_{old} + (1-\alpha_N) * N_{net} \qquad (2)$$

where:

$N_{new}$ is the newly filtered Network Buffer fill level value;
$N_{old}$ is the previous Network Buffer fill level value;
$N_{net}$ is the freshly calculated Network Buffer fill level value;
$\alpha_N$ is a parameter specifying how aggressive the algorithm reacts to the new calculated value, and $0 \le \alpha_N \le 1$.

Because the maximum Network Buffer fill level is not known, the latest network value is compared to the previous averaged value and this difference becomes the final result.

$$N_{fill} = (N_{net} - N_{old})/N_{new} \quad (3)$$

Packet Loss Adjustment Strategy: Network packet loss is defined to be in one of the following three states:

Congested: The Packet Loss ratio is high and the transmission quality is low.
Fully Loaded: The Packet Loss ratio is affordable and the transmission quality is good.
Under Loaded: The Packet Loss ratio is very small or zero.

The estimate of the network packet loss conditions is based on relative values of the filtered values of the Packet Loss ratio, $LR_{new}$, and two threshold values $LR_c$ (congested Packet Loss ratio) and $LR_u$ (under-loaded Packet Loss ratio):

$$\text{if } (LR_{new} \ge LR_c) \rightarrow \text{network congestion}$$

$$\text{if } (LR_c > LR_{new} \ge LR_u) \rightarrow \text{network fully loaded}$$

$$\text{if } (LR_u > LR_{new}) \rightarrow \text{network under loaded} \quad (4)$$

According to one exemplary embodiment, the above parameters can be:

$$\alpha_L = 0.5, LR_c = 0.05, LR_u = 0.02.$$

Network Buffer Fill Level Adjustment Strategy: Network congestion is defined to be in one of the following four states:

Congested: The network fill level is high and the transmission quality is low.
Fully Loaded: The network fill level is affordable and the transmission usage is good.
Under Loaded: The network fill level is underutilized and transmission should increase slightly.
Very Under Loaded: The network fill level is underutilized and the transmission should increase significantly.

$$\text{if } (N_{fill} \ge N_c) \rightarrow \text{network congestion}$$

$$\text{if } (N_c > N_{fill} \ge N_u) \rightarrow \text{network fully loaded}$$

$$\text{if } (N_u > N_{fill} \ge N_{vu}) \rightarrow \text{network under loaded}$$

$$\text{if } (N_{vu} > N_{fill}) \rightarrow \text{network very under loaded} \quad (5)$$

In one exemplary embodiment, the above parameters are set to:

$$N_c = 0.75; N_u = 0.45; N_{vu} = 0.15$$

Combined Adjustment: The combined algorithm includes both of the above two algorithms. Because "Network Buffer Fill Level" provides a more sensitive prediction of network congestion than "Packet Loss Ratio", the RTA uses "Network Buffer Fill Level" as a primary adjustment, and "Packet Loss Ratio Adjustment" as a secondary adjustment, according to the following specific conditions.

$$\text{if } (N_{fill} \ge N_c) \rightarrow \text{use higher of two adjustments}$$

$$\text{if } (N_c > N_{fill} \ge N_u) \rightarrow \text{use Network Buffer Fill Level adjustment} \quad (6)$$

RTA Testing

Network Test Configuration

Figure 15:
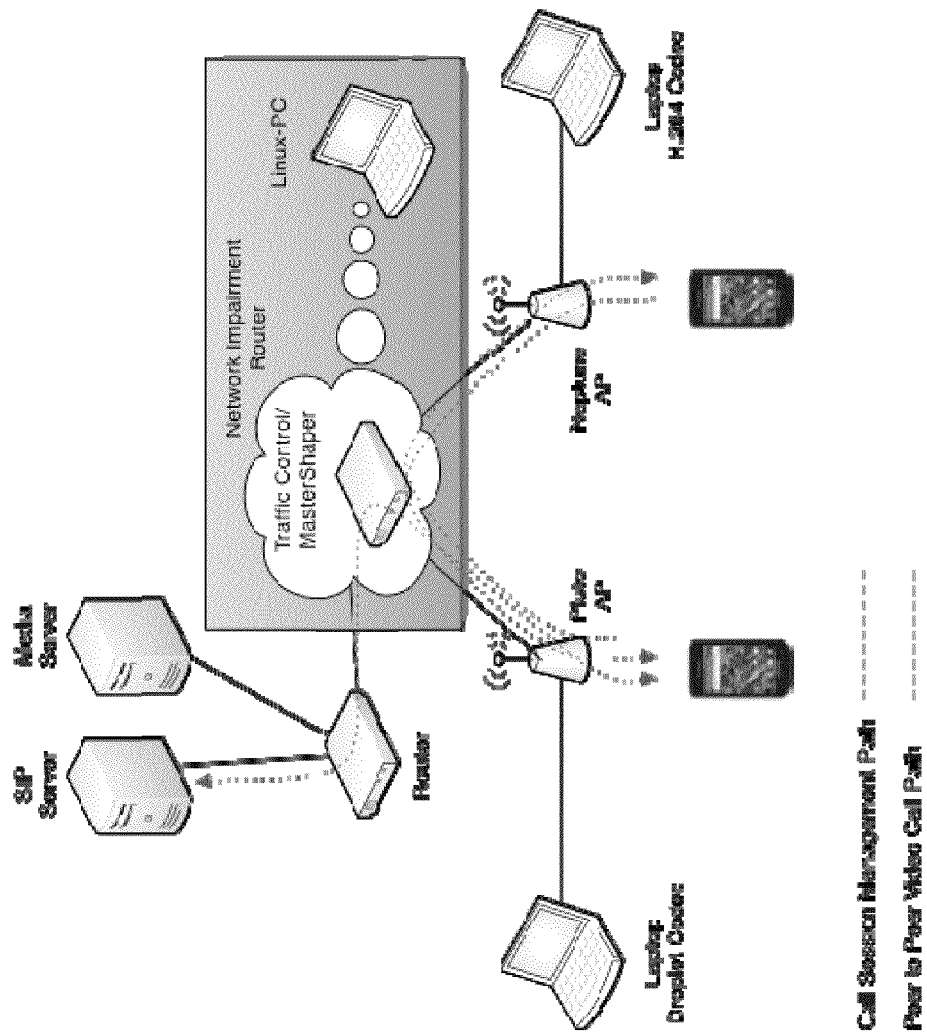
FIG. 15 illustrates an example of a network configuration.
Figure 16:
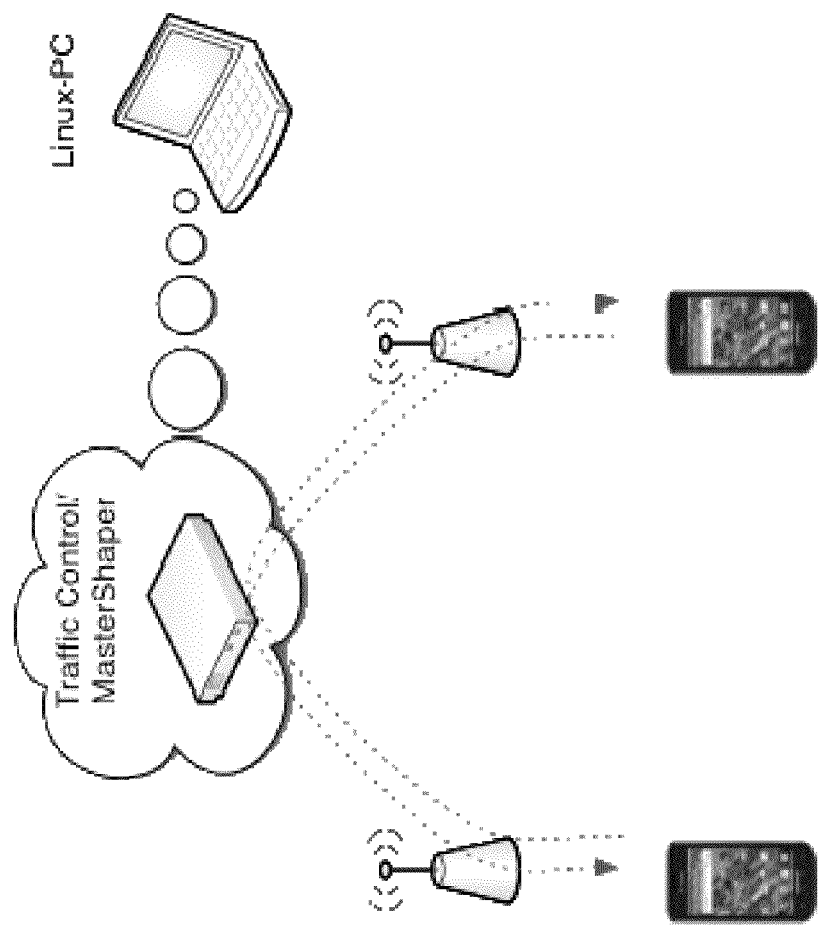
FIG. 16 illustrates an example of a network configuration.

Network configurations used for RTA performance testing and evaluation are shown in FIGS. 15 and 16. A standard off-the-shelf Linux based computer is used to implement the Network Impairment Router. Network impairment is realized using Traffic Control, a standard utility on Linux. Traffic Control is a command line based utility. MasterShaper is a network traffic shaper that leverage Traffic Control and other Linux utilities to provide a Web Interface for Quality of Service (QoS) functions.

Two devices are used to conduct real-time Peer-to-Peer Video Call tests. Each device connects to a separate access point, forcing the video call path to go thru the Network Impairment Router. Shell scripts leveraging Traffic Control/MasterShaper commands are used to control the Peer-to-Peer Video Call path. MasterShaper allows predetermined values and fluctuations of the bandwidth, delay, jitter, and packet loss to be set for the Video Call path.

IPerl is installed on both clients and used to validate the IFPW bandwidth. One iPerf client is setup as the server and the other as the client. iPerf performs a test to measure the effective bandwidth over the network connection between the client and the server.

Bandwidth Adaptation Testing

Figure 17:
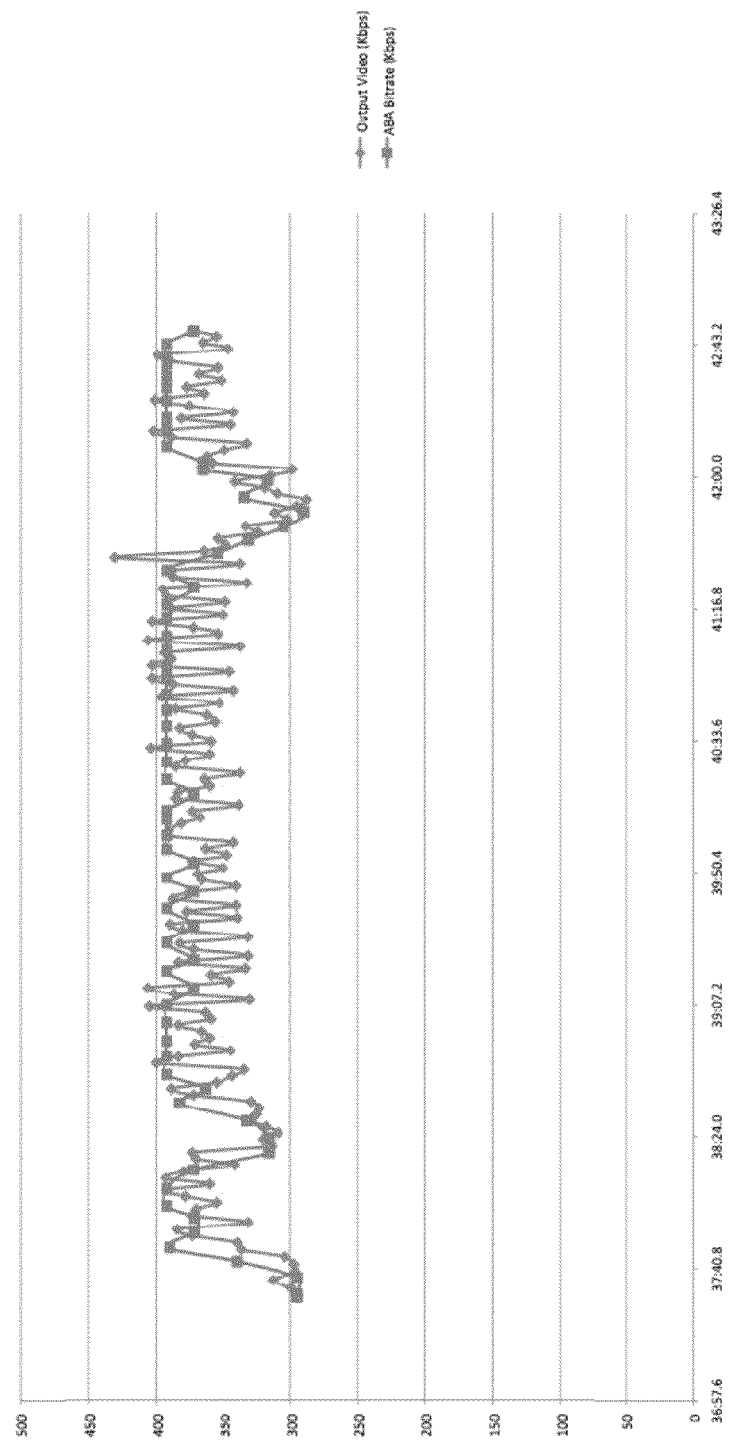
FIG. 17 illustrates an example of measured output video bit rate vs. target bit rate.
Figure 18:
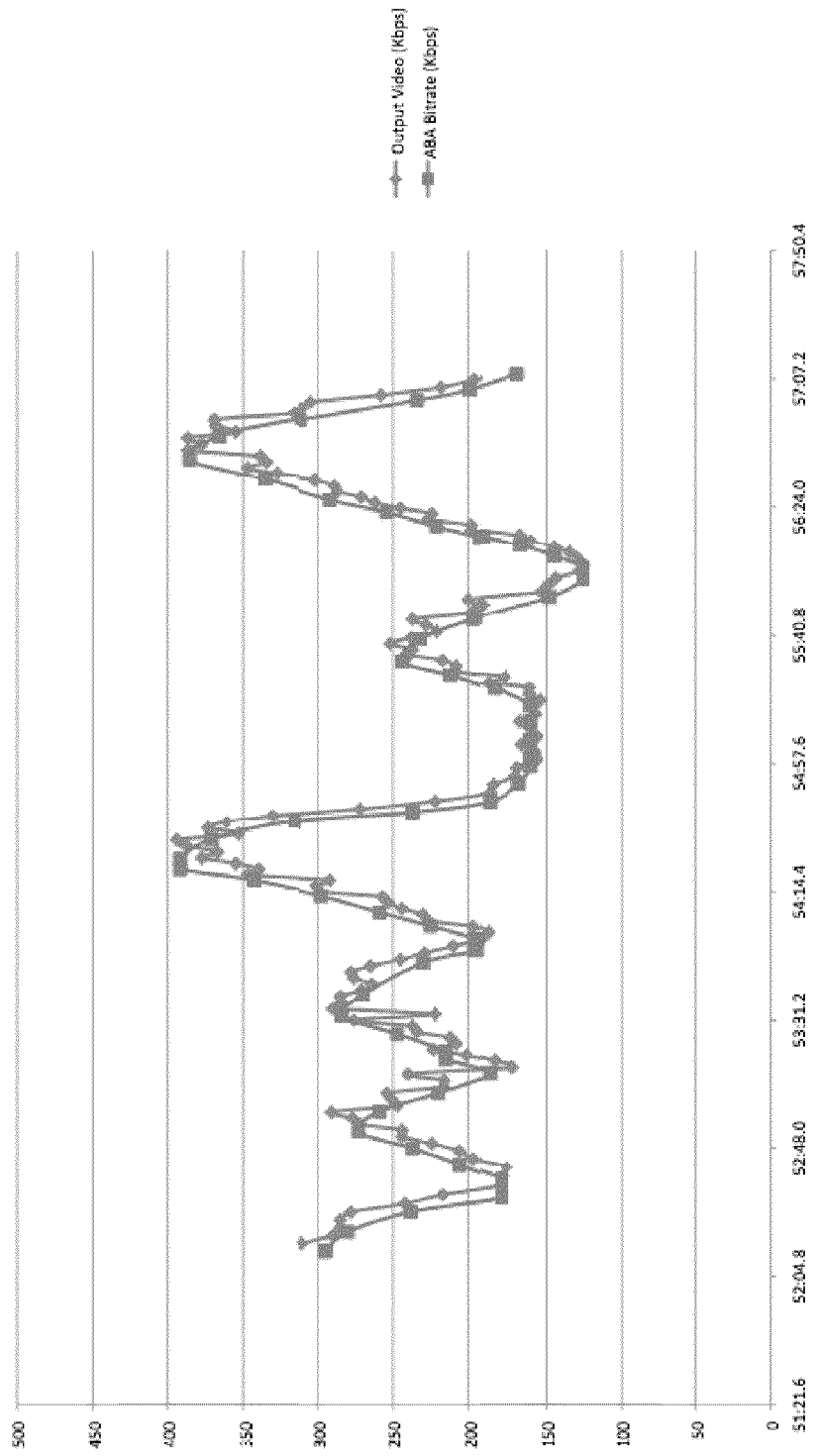
FIG. 18 illustrates an example of measured output video bit rate vs. target bit rate.

Bandwidth adaption test cases demonstrate the RVSP Client's capability to maintain high quality video under varying network bandwidth availability. The network bandwidth is first set to a target (constant) level, and a real-time video call session is initiated to demonstrate how the RTA sub-system allows the Client to adapt to the initial network capacity (FIG. 17). Next, the network bandwidth is varied during the video call session to demonstrate how the RTA sub-system allows the Client to track and adapt to variations in the network capacity (FIG. 18).

Jitter Adaptation Testing

Network jitter presents a particular challenge for video. In this test case we induce a jitter of up to 50 ms, and show how the Client continues to deliver high quality video. Qualitative results are produced by the Client, and can be observed using eclipse's logging facility (by connecting the device under test to an eclipse enabled PC). The Client reports the number of total audio and video packets that were found out of order, and the degree to which it was successful sorting the out-of-order packets. For qualitative results, the video can be observed during the call while jitter is introduced. Video is never frozen. Further, the Client's saliency capability is used to only refresh salient parts of the video when packets are lost. Additionally, by turning jitter on and off, the relative delay on Handset B is adjusted automatically. Hence the Client does not rely on a fixed buffer that introduce needless delay.

Packet Loss Adaptation Testing

All networks are prone to packet loss. This is a particular problem for wireless networks, or use cases where the packets must traverse multiple network boundaries to reach the target destination. In this test case, we implement packet loss rates up to 5% on the video communication path, and observe the resulting video quality. Since reducing the bandwidth can also cause the packet loss rate to vary, the Client bandwidth adaptation capability (ABA) is turned off for these tests. We turn off adaption by selecting the menu button during a video call, and clicking on "ABA Off" button. The result of this test is qualitative only. Similar to the jitter test case, the video never freezes, and in event of a packet loss, only salient parts of the video are refreshed, resulting in a more acceptable user acceptable experience.

Video Conferencing User Features

When deployed together, the RVSP Client and Server applications enable multiple participants to simultaneously create and share high-quality video with each other in real-time, with many key aspects of a face-to-face user experience.

Figure 19:
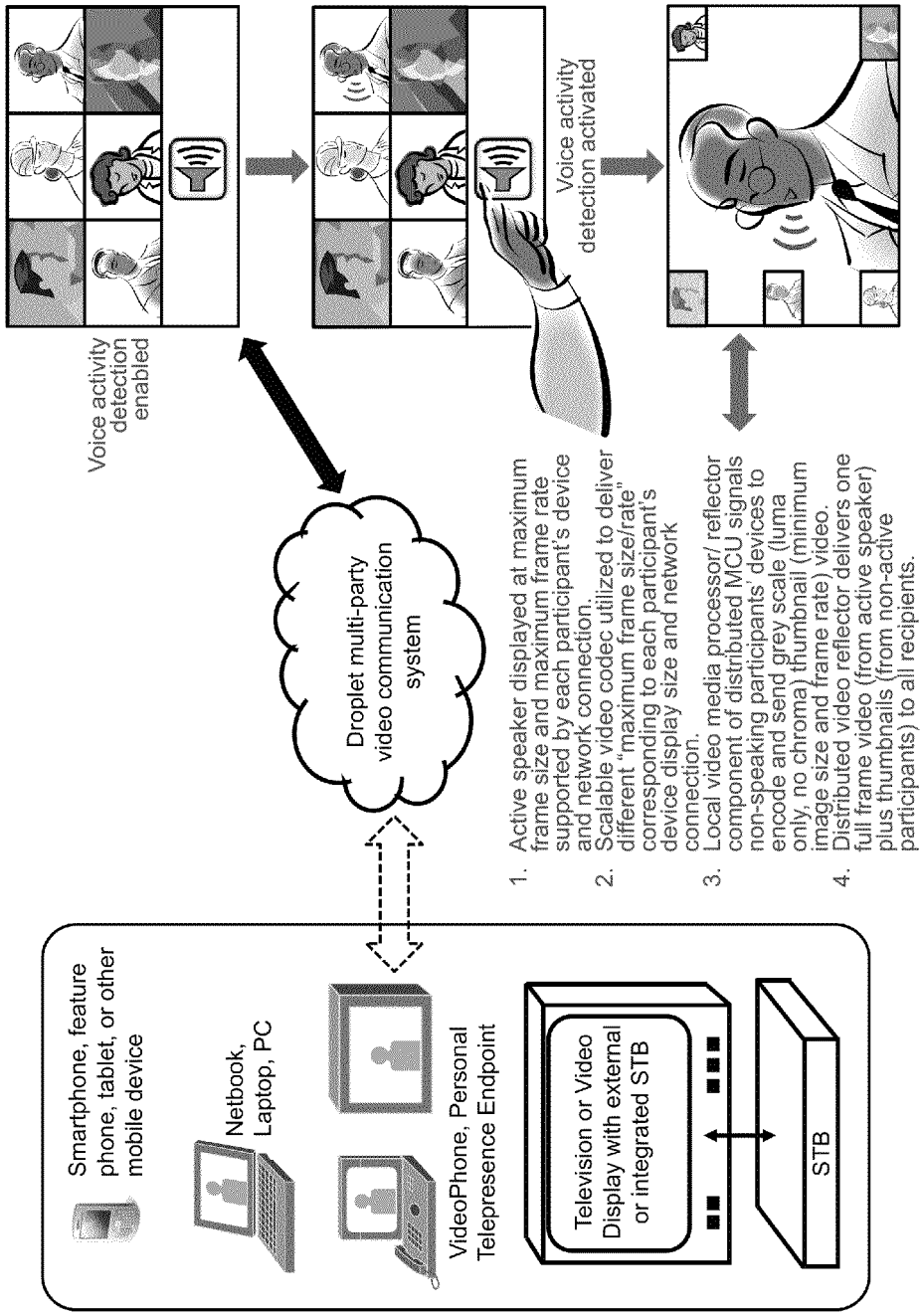
FIG. 19 illustrates an example of a system with voice activity detection according to an embodiment of the present invention.

FIG. 19 is an overview diagram of an all-software multi-user video conferencing system according to one embodiment of the present invention, with user-enabled voice activity detection.

Figure 20:
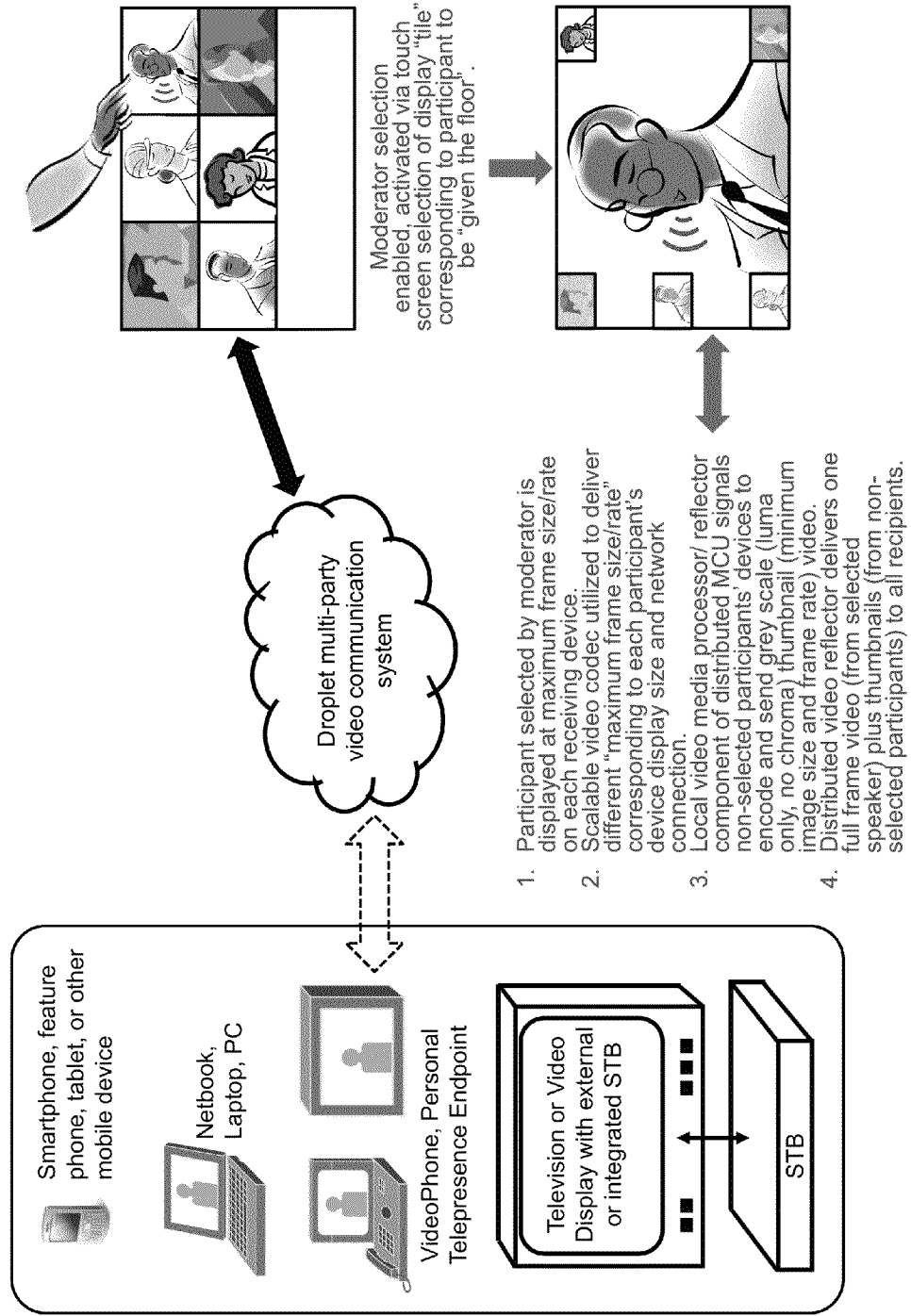
FIG. 20 illustrates an example of a system with moderator selection according to an embodiment of the present invention.

FIG. 20 is an overview diagram of an all-software multi-user video conferencing system according to one embodiment of the present invention, with the moderator able to select a participant to be given "the floor" via display at maximum video frame size/frame rate on all participants' device displays.

Figure 21:
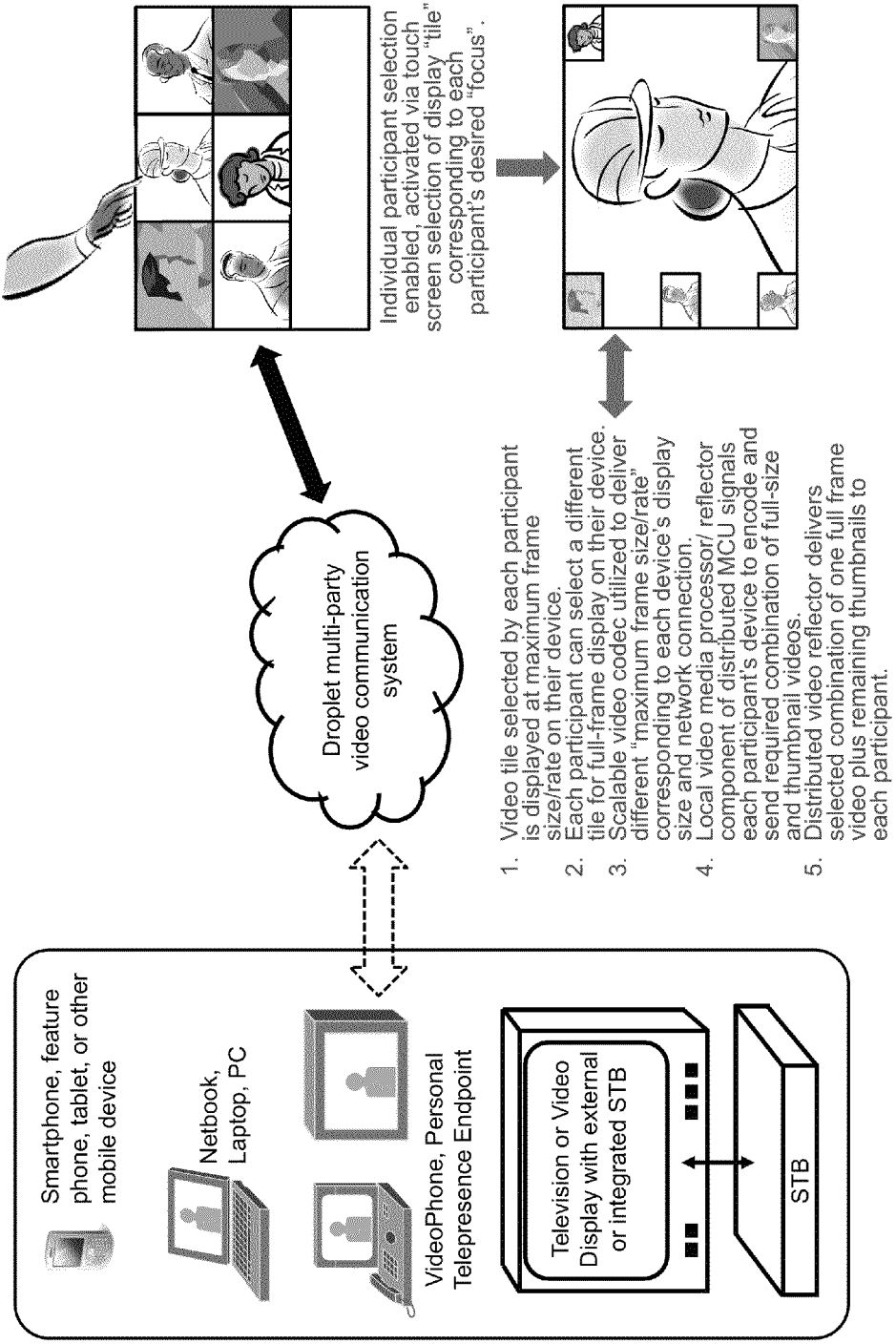
FIG. 21 illustrates an example of a system with participant selection according to an embodiment of the present invention.

FIG. 21 is an overview diagram of an all-software multi-user video conferencing system according to one embodiment of the present invention, with each participant able to select which other participant will be displayed at maximum video frame size/frame rate.

While several embodiments have been shown and described herein, it should be understood that changes and modifications can be made to the invention without departing from the invention in its broader aspects. For example, but without limitation, the present invention could be incorporated into a wide variety of electronic devices, such as feature phones, smart phones, tablets, laptops, PCs, video phones, personal telepresence endpoints, and televisions or video displays with external or integrated set-top-boxes (STBs). These devices may utilize a wide variety of network connectivity, such as 3G, 4G, WiFi, DSL, and broadband.

What is claimed is:

1. A real time communication platform, comprising,
   an application layer module interoperable on a processor associated with a mobile device having a memory and at least one camera, wherein the application layer module comprises at least one session control module;
   a digital technology media engine in communication with the application layer module and at least one media source accessible to the processor of the mobile device, wherein the digital technology media engine includes at least one codec; and
   a real time adaptation sub-system in communication with the application layer module and the processor, wherein the real time adaptation sub-system is capable of detecting and adapting to variations in one or more conditions to which at least one of the processor, memory, or the at least one camera is subjected; and
   wherein the at least one codec is capable of analyzing variations in the compressibility of uncompressed video frame sequences output from the at least one cameras, and communicating the analysis to the real time adaptation sub-system.

2. The system of claim 1, wherein subsequent to receiving the communication from the at least one codec regarding variations in the compressibility of uncompressed video frame sequences, the real time adaptation sub-system manages frame rate targets.

3. A method of providing real time communication, comprising:
   deploying a client application to a mobile device having a memory and at least one camera, wherein the client application comprises:
   an application layer module capable of being interoperable on a processor associated with the mobile device and comprising at least one session control module;
   a digital technology media engine capable of communicating with the application layer module and at least one media source accessible to the processor of the mobile device, and including at least one codec; and
   a real time adaptation sub-system capable of communicating with the application layer module and the processor, and further capable of detecting and adapting to variations in one or more conditions to which at least one of the processor, memory, or the at least one camera is subjected; and
   wherein the at least one codec analyzes variations in the compressibility of uncompressed video frame sequences output from the at least one cameras, and communicates the analysis to the real time adaptation sub-system.

4. The method of claim 3, wherein subsequent to receiving the communication from the at least one codec regarding variations in the compressibility of uncompressed video frame sequences, the real time adaptation sub-system manages frame rate targets.

* * * * *